United States Patent [19]

Davis

[11] Patent Number: 5,420,937
[45] Date of Patent: May 30, 1995

[54] FINGERPRINT INFORMATION EXTRACTION BY TWIN TRACKER BORDER LINE ANALYSIS

[75] Inventor: Phillip S. Davis, Carthage, Mo.

[73] Assignee: The Phoenix Group, Inc., Pittsburg, Kans.

[21] Appl. No.: 115,515

[22] Filed: Sep. 1, 1993

[51] Int. Cl.⁶ .............................................. G06K 9/00
[52] U.S. Cl. ..................................... 382/125; 382/124
[58] Field of Search ................... 382/1, 2, 3, 4, 5, 48, 382/30, 34; 356/71; G06K 9/00, 9/62, 9/68, 9/20, 9/74

[56] References Cited

U.S. PATENT DOCUMENTS

| | | | |
|---|---|---|---|
| 3,558,864 | 1/1971 | French | 382/4 |
| 3,699,519 | 10/1972 | Campbell | 382/4 |
| 3,893,080 | 7/1975 | Ho et al. | 382/4 |
| 4,015,240 | 3/1977 | Swonger et al. | 382/4 |
| 4,156,230 | 5/1979 | Rigarati et al. | 382/4 |
| 4,210,899 | 7/1980 | Swonger et al. | 382/4 |
| 4,310,827 | 1/1982 | Asai | 382/4 |
| 4,696,046 | 9/1987 | Schiller | 382/5 |
| 4,747,147 | 5/1988 | Sparrow | 382/4 |
| 4,790,564 | 12/1988 | Larcher et al. | 382/5 |
| 4,817,183 | 3/1989 | Sparrow | 382/4 |
| 4,896,363 | 1/1990 | Taylor et al. | 382/5 |
| 4,944,021 | 7/1990 | Hoshino et al. | 382/5 |
| 4,947,442 | 8/1990 | Tanaka et al. | 382/5 |
| 4,948,443 | 8/1990 | Costello | 382/4 |
| 5,040,223 | 8/1991 | Kamiya et al. | 382/4 |
| 5,040,224 | 8/1991 | Hara | 382/4 |
| 5,067,162 | 11/1991 | Driscoll, Jr. et al. | 382/5 |
| 5,105,467 | 4/1992 | Kim et al. | 382/4 |
| 5,109,428 | 4/1992 | Igaki et al. | 382/4 |
| 5,187,747 | 2/1993 | Capello et al. | 382/4 |
| 5,239,590 | 8/1993 | Yamamoto | 382/4 |

Primary Examiner—Jose L. Couso
Attorney, Agent, or Firm—Litman, McMahon & Brown

[57] ABSTRACT

A method for minutia extraction from a digitized fingerprint array by twin tracker border line analysis includes scanning the array to detect ridge pixels, setting up a pair of tracker pixels or trackers on opposite borders of the ridge, moving the trackers along the borders of the ridge, periodically calculating the midpoint between the trackers to generate a centerline between the borders, calculating an average slope of the centerline, and periodically testing between the trackers for the presence of valley pixels. When such a valley pixel is detected, a sequence of aberration tests is conducted to identify the type of aberration. If the aberration tests all fail, the aberration is identified as a ridge diversion, the location and slope of which are stored as a minutia in a minutia location table. Ridge endings are detected by comparing the coordinates of the trackers after each move. If a ridge ending is detected, an attempt is made to jump to another ridge within a given proximity to the current ridge. When all the ridges have been processed, the valleys of the fingerprint are processed in a similar manner to locate valley minutiae, the locations and slopes of which are stored in the minutia location table associated with the fingerprint.

47 Claims, 13 Drawing Sheets

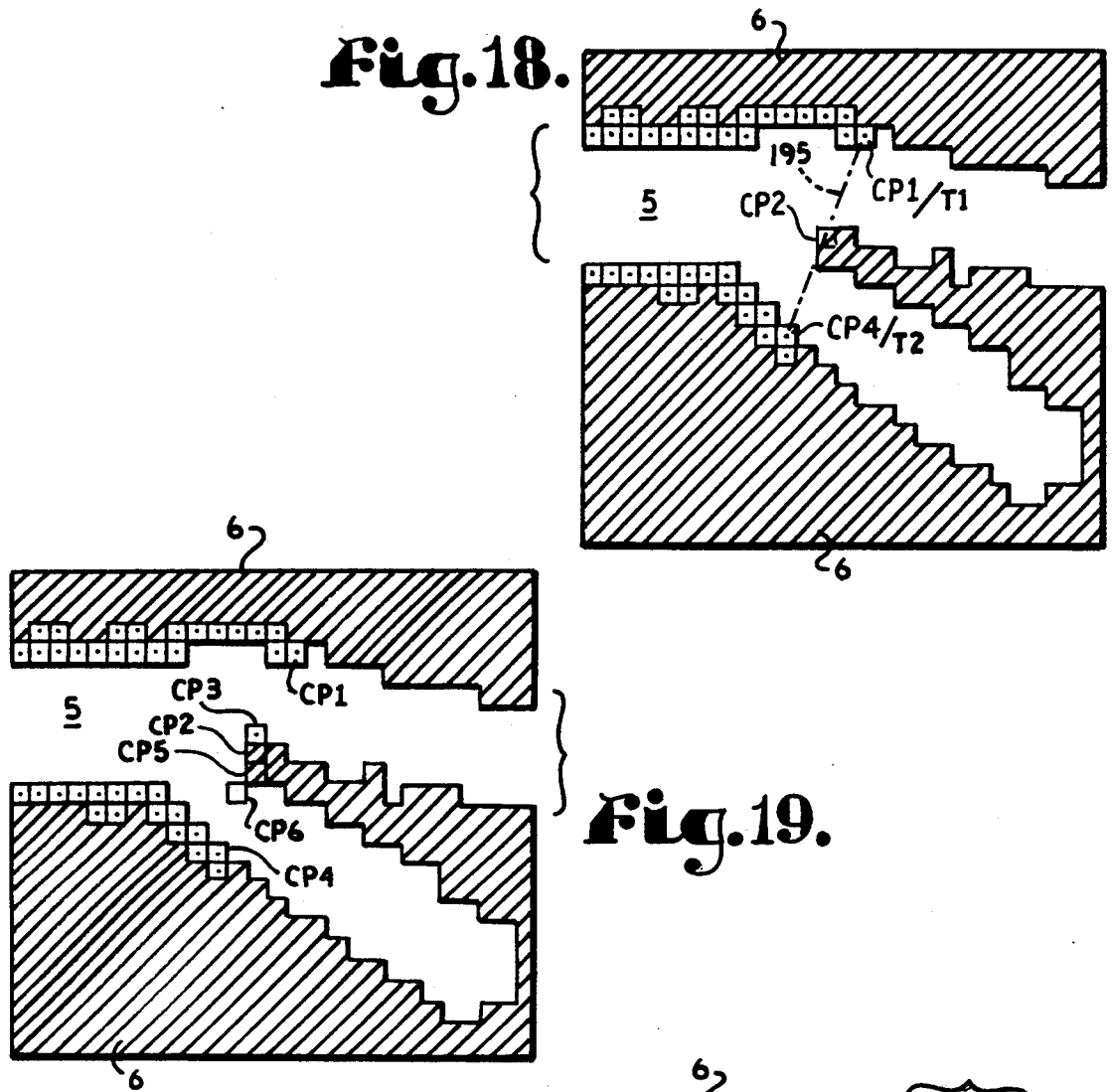
Fig.18.
Fig.19.
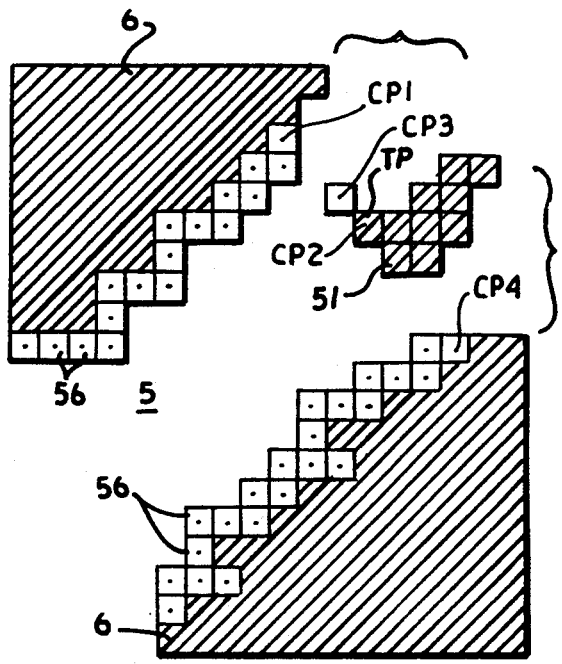
Fig.20.

FINGERPRINT INFORMATION EXTRACTION BY TWIN TRACKER BORDER LINE ANALYSIS

BACKGROUND OF THE INVENTION

The present invention relates to a method for fingerprint information extraction by border line analysis of ridges and valleys of the print, the determination of average centerlines of the ridges and valleys, and the identification of minutiae of the ridges and valleys by their locations coupled with the average slope of the centerline at such minutiae.

Fingerprints have evolved as a standard for the positive identification of individual persons. They were first applied in the area of criminal investigation but, more recently, have also been applied to access control systems. Fingerprint identification in the law enforcement over many decades has demonstrated the uniqueness of the fingerprints of individuals. While it is theoretically possible that two fingerprints could be the same, such an occurrence has never been reliably documented. Barring an injury which causes scarring, a fingerprint pattern does not change with age. The ridge skin is live tissue that can change from day to day due to wear, and the ridge pattern will re-emerge, even after considerable abrasion.

Fingerprints are formed by raised friction ridges which aid in gripping objects and recessed valleys which separate the ridges. Fingerprint "minutiae" are conventionally defined as ridge endings or ridge bifurcations where a ridge splits into two ridges. Other fingerprint features or patterns, which can be visually recognized, are whorls which are concentric or spiral appearing patterns and deltas where a number of roughly parallel ridges appear to converge or diverge.

Early techniques for fingerprint classification and identification involved the analysis of the spatial relationships of major features and patterns which are visible to the human eye, often with the aid of optical magnification. Such visual techniques can be extremely laborious. In order to expedite the process, computerized fingerprint analysis techniques have been developed and refined.

Automated fingerprint analysis systems generally require that a "live" fingerprint or an ink replica of a fingerprint be optically scanned to digitally record the patterns of ridges and valleys as an ordered set of pixels or picture elements within a fingerprint data array. Each pixel has a binary value corresponding to its recorded color and a position within the array related to Cartesian coordinates of the pixel within the original image. Thus, the image can be reconstructed for visual display and the pixels can be addressed for analysis of the patterns thereof. Many fingerprint scanners record the fingerprint image in black and white, with logic zeros representing valley pixels as black and logic ones representing ridge pixels as white, although the designation of valleys and ridges respectively as logic zeros and ones or black and white, or any other colors, is arbitrary.

The great majority of conventional automated fingerprint analysis systems employ a "thinning" process on the image array to skeletonize the represented image to facilitate the techniques used to detect and locate features which are machine recognizable, such as line endings and bifurcations, referred to as minutiae, and the slope of the ridges near the detected minutiae. In general, thinning is a multiple pass process which progressively shaves away excess pixels of the ridges, for example, until the ridge is reduced to a single line of pixels having a shape approximating that of the original ridge.

A significant problem with thinning in fingerprint analysis is that thinning introduces errors. Thinning not only strips away pixels along the sides of ridges, but from the ends as well. Thus, line endings are displaced from their actual positions. Another problem with thinning is the creation of "false minutiae". Particles of dust, flaked skin, oils, and other extraneous matter can lodge within the valleys between the ridges of a fingerprint. Additionally, an optical scan of a fingerprint, at the resolution commonly used, can detect skin pores which can occur along a ridge. The thinning process often results in a bridge between ridges caused by extraneous matter and in ridge gaps where pores occur. The bridges are analyzed as false bifurcations, and the pores are analyzed as either as false bifurcations or false line endings. Such false minutiae not only reduce the accuracy of the data representing a particular fingerprint but also increase the quantity of data within such a data file. Another problem with analysis of thinned fingerprint images is that thinning the ridges makes it impossible to accurately analyze the original valleys which, being complementary to the ridges, can provide additional identification data of the fingerprint or at least data to corroborate the accuracy of the data derived from the ridges.

The pixels of a fingerprint array in which the ridges have been skeletonized by thinning may be analyzed using a "roving box" technique in which the color of each orthogonally and diagonally adjacent pixel to each pixel is tested. Such analysis is used to detect the minutiae of the ridges of the fingerprint. Process time is conserved to some extent by not checking pixels adjacent a background pixel. However, at bifurcations of lines, redundant indications of bifurcation occur. Additionally, any line consisting of at least two pixels results in two line ending entries in the minutia table related to the fingerprint. The result of such analysis of a thinned fingerprint image is a minutia table having a large number of entries, many of which are of minimal significance. The time required for comparing the minutia tables of fingerprints analyzed in this manner is considerable because of the large number of entries in the minutia tables.

While automated fingerprint analysis has been employed in investigative areas to identify unknown persons, there is a growing interest in using fingerprints to verify the identity of an individual, as for access control systems. One of the practical requirements of an access control system, especially as related to entry through security doors, is that the verification occur quickly. Verification of identity using fingerprints can be expedited by an enrollment process in which a database is constructed from a minutia table of a fingerprint of each individual having access rights or privileges, in combination with means such as a personal identification number or PIN.

Entry of the PIN quickly accesses the corresponding minutia table. A live fingerprint scan is taken, the digitized fingerprint is analyzed, and the live minutia table is compared with the enrolled minutia table. No two fingerprint scans of a given finger are exactly identical. Factors such as the force of pressing the finger tip on the scanner window and even instantaneous blood pressure can cause minor differences between scans taken in immediate succession. Therefore, a scoring system is generally used to judge the comparison of one minutia table with another. A threshold number of comparison "hits" or matches of minutiae is required to trigger a verification signal which releases a security door or the like.

In thinned image fingerprint verification systems, the time required to thin the image, detect minutiae, and compare minutia tables can amount to a number of seconds and even several minutes in some cases, even with a relatively fast computer which processes the information. Such a length of verification time would be impractical, for example, at a research and development facility, an industrial plant, or the like having a large number of workers who must routinely pass through numerous security doors to move throughout the plant.

In order to make fingerprint based access control systems practical, a method of fingerprint analysis is needed which is much faster and more accurate than conventional systems based on roving box analysis of thinned fingerprint images.

SUMMARY OF THE INVENTION

The present invention provides an improved method or process for extracting identifying characteristics or minutiae of fingerprints for enrollment in a fingerprint database for purposes of verification of the identity of an individual, as in access control systems, or for determining the identity of an individual by comparison with previously recorded prints, as in law enforcement applications. In general, a fingerprint is scanned to generate a two dimensional array in which pixels of the image of the scanned fingerprint have associated therewith binary values, such as bytes, which indicate a color, in a pattern analogous to the ridges and valleys (collectively, elements) of the fingerprint.

Initially, the image pixel array is scanned vertically to detect a transition from the background color to the ridge color. The array is scanned further to detect a transition back to the background color. The vertically aligned pixels just within the ridge border along with pixels just within the borders in opposite lateral directions from a midpoint between the vertically aligned pixels are designated as starting signposts. The starting signposts are used in routines to determine the starting direction of a pair of tracker pixels T1 and T2 which will cause the trackers to remain against the borders of the ridge. The opposite border lines of each element are located or "border processed" by the "movement" of the tracker pixels along the opposite borders and observing the color of pixels encountered along the border and between the tracker pixels. In reality, no pixels are moved, only the focus of analysis; however, it is conceptually convenient herein to refer to the trackers as moving to facilitate understanding of the present invention.

A slope matrix for the fingerprint is defined which has entry positions for segments or blocks of the pixel array, as divided by a slope grid. Additionally, a minutia table is defined for the fingerprint to store identified minutiae, as will be described below. As the trackers are incrementally moved, a center point between the trackers is determined, which generates a centerline between the border lines. Periodically, the average slope of the centerline is calculated and entered into the appropriate segment of the slope matrix. The slopes of the ridges or valleys within the bounds of a given slope segment are averaged over the process.

Periodically as the trackers are moved, a check is made for the existence of background color pixels between the trackers, the existence of which is referred to herein as aberrations. If such an aberration is detected, tests are conducted to determine the nature of the aberration, which may be a pore in the ridge, a spur above or below the ridge, a convergence of ridges, or a divergence of a ridge.

In the aberration tests, a number of critical points are established in relation to the current positions of the tracker pixels and the detected aberration pixel. The aberration tests are conducted in a definite sequence, begin at one of the critical points, and proceed in the current general direction or against the current general direction, depending on the aberration test being conducted. When an aberration test fails, the next test in the sequence proceeds. When an aberration test succeeds, a corresponding action is taken and the sequence is exited.

In the test for a pore, border processing or "bordering" is begun at a selected critical point and, if the bordering returns to the starting critical point within a selected number of bordering iterations, the pore test has detected a pore. If so, the border pixels of the pore are changed to the ridge color, effectively removing the pore from the ridge, and the current ridge bordering process is resumed.

In aberrations to check for, sequentially, a top spur, a bottom spur, a top convergence, and a bottom convergence, bordering begins at a first selected critical point with an appropriate tracker (T1 for a top spur or convergence, or T2 for a bottom spur or convergence). The bordering process proceeds in a given direction of travel and, if a second selected critical point is reached within a selected number of bordering iterations, the current aberration test has succeeded. If the aberration is a spur, the tracker bordering it is advanced along the border of the spur, and the ridge bordering process is resumed. If a convergence is detected, the ridge bordering process is terminated, and the pixel array is again scanned to detect a ridge which has not yet been "bordered". The portions of converging ridges which have not been previously bordered will eventually be detected and will then be bordered. Later, bordering of ridges will detect the convergences as divergences. It should be pointed out that convergences and divergences are relative terms describing bifurcations of ridges and are referenced to the initial direction of travel of the trackers.

If all the previous aberration tests have failed, a divergence has been adequately detected. If so, the forks of the divergence are bordered in the normal manner. The coordinates of a selected one of the critical points is stored in a divergence table or array along with an average centerline slope in the vicinity of the divergence. Thereafter, the image array is scanned for a new starting position.

In normal bordering, the trackers are moved in movement cycles to minimize the distance therebetween rather than in necessarily equal numbers of steps per tracker. At the end of each movement cycle, the midpoint between the trackers and the average slope of the centerline are calculated, and a value is stored in the midpoint pixel to indicate a centerline color. An aberration check is conducted after each movement cycle. If no aberration is detected, the next movement cycle occurs. After each tracker has moved one pixel along the border, the byte associated with the new pixel is changed to indicate a border color other than that of the ridges and valleys, and the X and Y coordinates of the trackers are compared. If both trackers have the same coordinates, a possible ridge ending is indicated. A ridge ending test is conducted in which one of the trackers checks the next several border pixels. If a color other than the border color is detected, a true ridge ending has not been found and bordering continues. If a ridge ending is found, an attempt is made to "jump the gap" between the current ridge and another ridge which may be positioned within a selected proximity to the current ridge ending.

Generally, the gap jumping routine projects a gap-jump line from the detected ridge ending a selected number of pixels in the direction of the slope of the average centerline of the current ridge to a target pixel, provided the centerline of the current ridge had at least a selected number of entries. Moving one pixel at a time, the gap jumping routing checks the pixel color of each pixel between the ridge end pixel and the target pixel, looking for a ridge color pixel. If no ridge color pixel is encountered, the slope of the centerline at the line ending is increased and decreased, and the pixels between the ridge ending pixel and the target pixel are again tested. If the ridge color is not detected in the three tries, the line ending stands and the pixel array is again scanned for a new starting location. If the ridge color is detected, the trackers will be started on the new ridge and bordering will proceed. The centerline of the previous ridge will be connected to the centerline of the new ridge, such that the two adjacent ridges will be effectively connected.

After all the ridges are bordered, divergences located, and slope matrix generated, the valleys will be bordered using the same procedures. The valley bordering will detect ridge endings as valley divergences which will be stored with coordinates and slopes in the divergence table. The gap jumping procedure of the ridge bordering will reduce the number of detected divergences of valleys. This will expedite valley bordering in comparison to the time which otherwise would be consumed if the valley bordering were required to detect divergences at each line ending.

The prior art employs a thinning process which can distort the ridges and valleys of the fingerprint image. In contrast, the present invention does not use a thinning process. As a result, the methods of the present invention extract information from a fingerprint with greater accuracy and performs such extraction more efficiently than the prior art. Accordingly, the bordered ridges and valleys more truly reflect the original ridges and valleys of the fingerprint image; fingerprint minutiae are located with greater accuracy; and the valleys, being complementary to the ridges, can be analyzed to provide additional data on the fingerprint and to corroborate the accuracy of the information derived from the ridges. Additionally, the creation of false minutiae is minimized by the processes of the present invention, and relatively insignificant minutiae are eliminated. The result of the methods of the present invention is a minutia table having a minimal number of entries with a high degree of accuracy. Thus, the comparison of minutia tables generated using the methods of the present invention is expedited, as compared to comparisons of tables generated by existing methods. The identification of an individual can be further expedited by using the slope matrices to narrow the field of search and using the minutia tables to positively identify the owner of the fingerprint.

OBJECTS AND ADVANTAGES OF THE INVENTION

Well known in the field are verification systems and identification systems. Both types of systems are computer based and rely on fingerprint processing technology to accomplish their intended purposes. Both types of systems would benefit from an improved method for extracting information from a fingerprint that is rapid, economical, and accurate. Verification systems verify that a person is who he or she claims to be. These systems employ an assisting device, such as a personal identification number (PIN), smart card, or similar item as the lead identifier along with the person's fingerprint to verify the person's claimed identify. These systems are typically employed for computer or physical access control or at point of transaction applications. Identification systems identify an individual based on their fingerprints. These systems are traditionally employed in law enforcement or other setting where an assisting device is either not feasible or not desirable.

The principal objects of the present invention are: to provide an improved method for processing and extracting information from fingerprints using computer analysis of digitized images of fingerprints; to provide such a method for fingerprint processing which does not require a ridge thinning process or the analysis of the pixels adjacent to each pixel of the fingerprint image; to provide such a method which identifies and locates minutiae of a fingerprint by analysis of the pixels bordering the ridges and valleys of the image; to provide such a method which employs a pair of tracker pixels or trackers which follow the opposite borders of the ridges or valleys and which are used to find a centerline of the ridges or valleys and a running average slope of the centerline; to provide such a method in which the presence of aberrations or components of pores along a ridge, islands along a valley, spurs above or below a ridge or valley, convergences of ridges or valleys, and divergences of ridges or valleys can be detected by analysis between the trackers; to provide such a method in which the fingerprint image is divided by a grid, and the average slope of fingerprint elements within the grid blocks is determined; to provide such a method in which a minutia table is generated from the located minutiae of ridges and valleys for comparison with the minutia tables of other fingerprints; to provide such a method in which the number of minutiae in the tables generated is minimized for expedited comparison with other tables; to provide such a method in which the minutiae located for a fingerprint have a much higher degree of accuracy than with previous methods; to provide such a method in which the time required for generation of the minutia table of a fingerprint is minimized; to provide such a method which is suitable for analysis of live fingerprint scans as well as scans of fingerprints previously recorded as ink images on media such as cards; to provide such a method which is suitable in terms of accuracy and minimized time for both access control systems and investigative purposes; to provide such a method which is adaptable for analysis of other types of digitized images, such as in optical character recognition; and to provide such a method of fingerprint information extraction by twin tracker border line analysis which is economical to implement, which is accurate and efficient in practice, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 18 is a fragmentary pixel diagram illustrating a process for testing for the presence of an aberration between the borders of a fingerprint ridge in the fingerprint processing method of the present invention.

FIG. 19 is a fragmentary pixel diagram illustrating the creation and placement of critical points in the analysis of an aberration in the fingerprint processing method of the present invention.

FIG. 20 is a fragmentary pixel diagram illustrating a pore test of an aberration in the fingerprint processing method of the present invention.

DETAILED DESCRIPTION OF THE INVENTION

Figure 1:
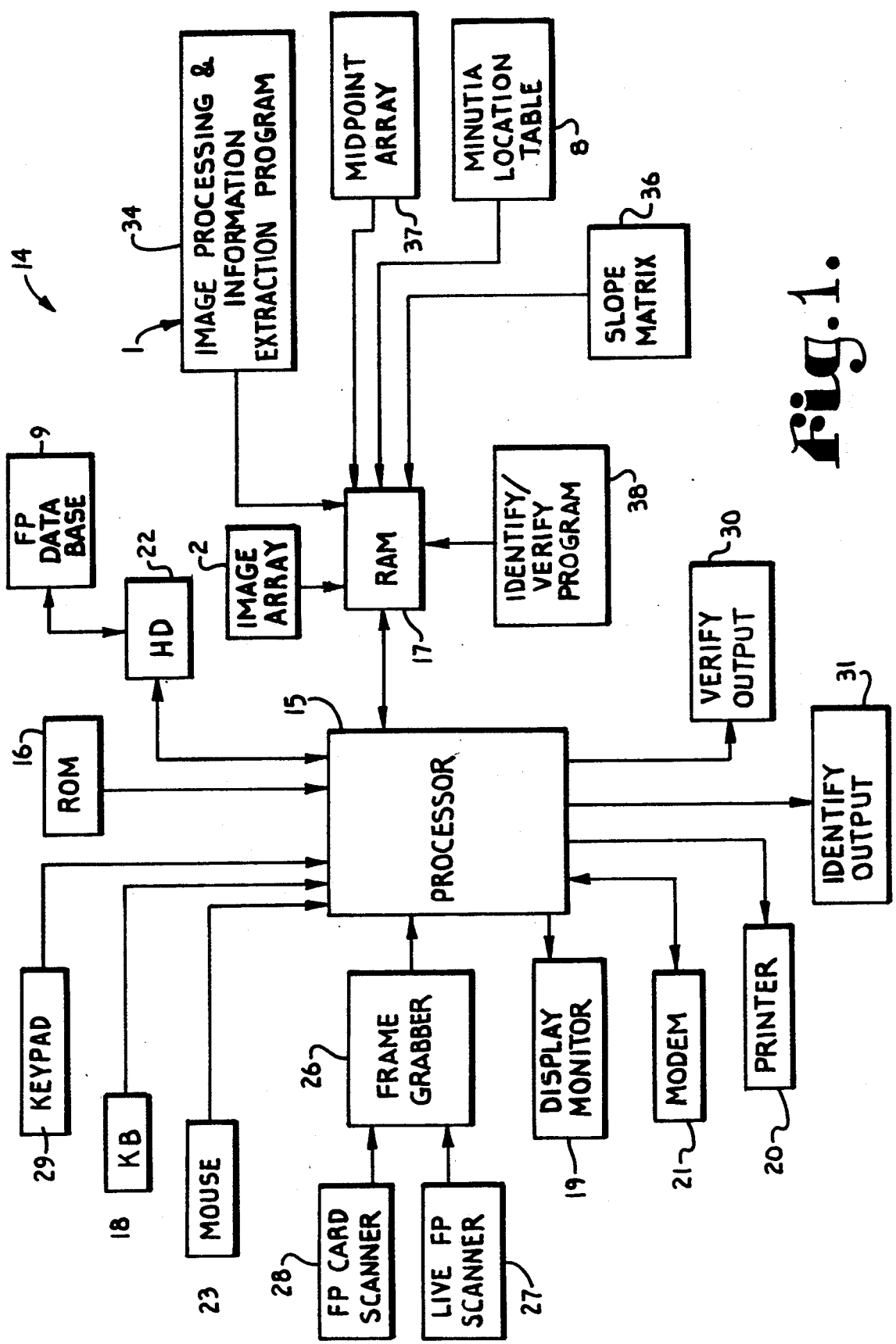
FIG. 1 is a block diagram illustrating a computer system suitable for practicing the fingerprint information extraction or processing method embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a method (FIG. 2) for fingerprint information extraction by twin tracker border line analysis which embodies the present invention. In general, the fingerprint information extraction or processing method 1 is used to analyze a digitized image 2 (FIG. 3) of a fingerprint to locate "minutiae" such as bifurcations 3 and endings 4 of ridges 5 and valleys 6 of the image 2 in terms of X and Y Cartesian coordinates of the image 2 and the slope of a centerline 7 (FIG. 13) of the ridge 5 or valley 6 in the vicinity of a minutia. The coordinates and slopes of the bifurcations 3 of the ridges 5 and valleys 6 are stored in a minutia location table 8 (FIG. 1) associated with the particular fingerprint and may be subsequently compared to minutia tables 8 of live scanned fingerprints or tables 8 stored in a fingerprint (FP) database 9.

FIG. 1 illustrates a computer system 14 which is suitable for use in practicing the fingerprint processing method 1 of the present invention. The system 14 includes a central processing unit or processor 15 with read/only memory (ROM) 16, read/write memory (RAM) 17, a keyboard (KB) 18, a display monitor 19, a printer 20, a modem 21, a hard disk 22, and a mouse 23. The components 15-23 are typical components of a conventional personal type computer. The system 14, as used to practice the method 1, also includes a frame grabber board 26, to which is connected a live fingerprint (FP) scanner 27 which operates using optical principles. The system 14 may also include a fingerprint card optical scanner 28 for reading and digitizing fingerprints recorded in ink on a medium such as a card or sheet of paper.

A keypad 29 may be connected to an input port (not shown) for purposes such as entering a personal identification number (PIN) for use of the system 14 and method 1 in an access control system. The system 14 is provided with an output port including a "verify" output line 30 which, upon verifying the correspondence between a PIN and an analyzed fingerprint scanned by the live scanner 27, is routed through an appropriate driver (not shown) to means such as a solenoid actuated bolt (not shown) to allow entry of an individual through a security door (not shown). The system 14 may also be provided with an "identify" output port 31 over which data representing the identity of an individual, derived from a comparison of a scanned fingerprint with a print in the fingerprint database 9, may be communicated, as to another computer (not shown). The components 26-31 of the system 14, while not conventional parts of a typical personal computer system, are nonetheless fairly typical of a computer system used in fingerprint analysis.

The fingerprint database 9 is typically stored on the hard disk 22. During the analysis of a fingerprint image 2 using the method 1, an image processing and information extraction program 34, which embodies the fingerprint processing method 1 of the present invention, is stored in the RAM 17 of the computer system 14. Additionally, the minutia location table 8, a slope matrix 36, and a midpoint array 37 are stored in RAM 17, as will be detailed further below. Eventually, the minutia table 8 and the slope matrix 36 will be stored in the fingerprint database 9 along with personal data regarding the individual from which the fingerprint was taken for use in identifying or verifying a subsequently scanned fingerprint by an identify/verify program 38. The identify/verify program 38 is beyond the scope of the present invention and will not be detailed further.

Figure 3:
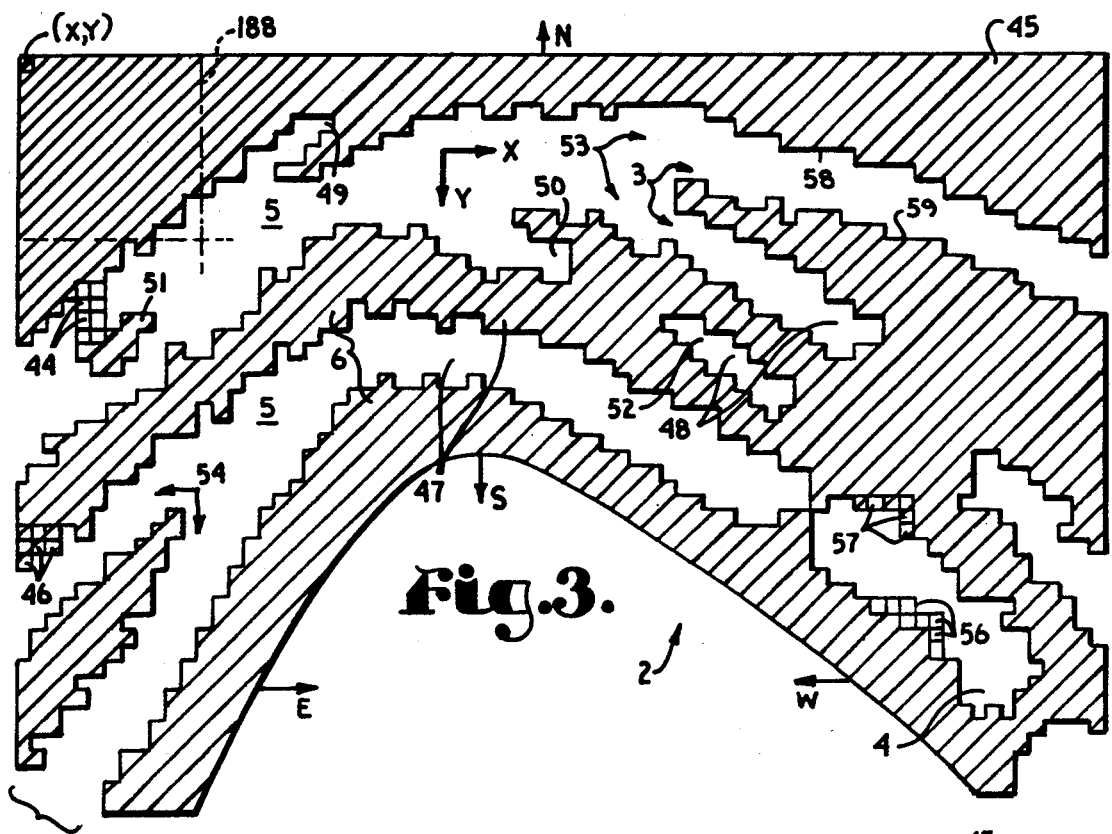
FIG. 3 is a fragmentary diagrammatic view illustrating a segment of a two color digitized image of a fingerprint prior to processing by the fingerprint processing method of the present invention.
Figure 4:
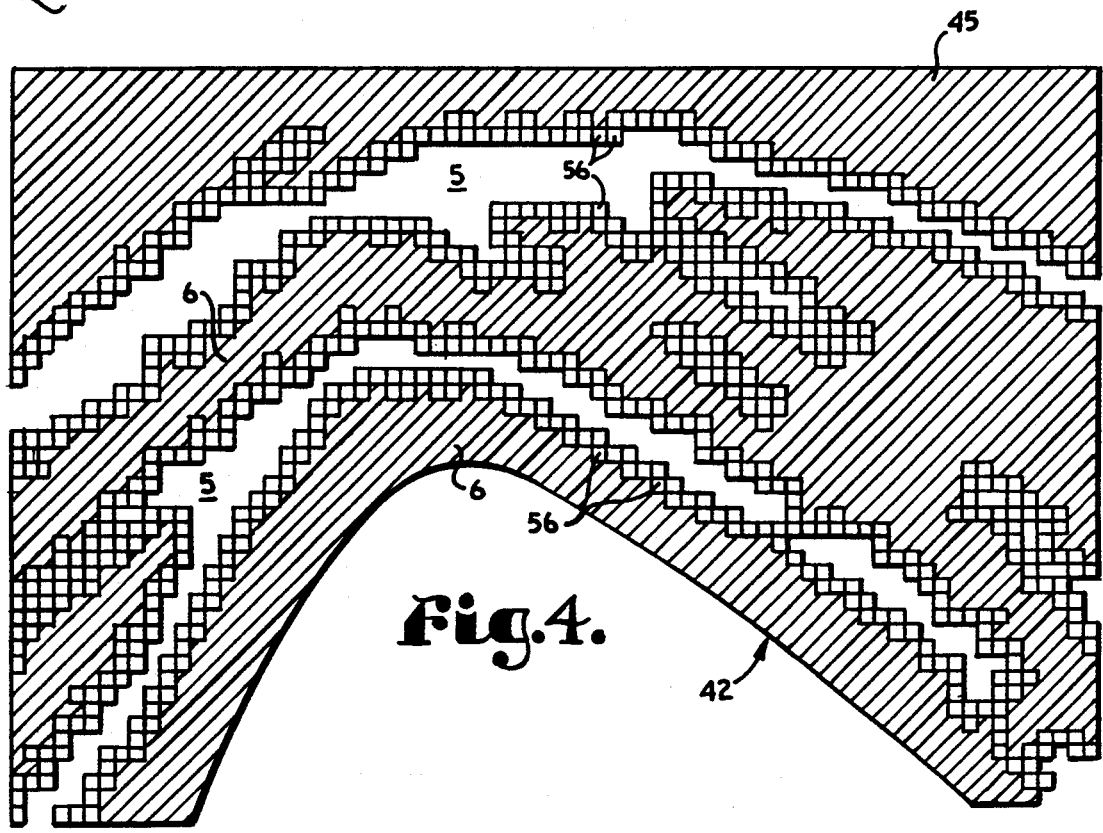
FIG. 4 is a view similar to FIG. 3 and illustrates the image segment subsequent to border processing of the ridges of the fingerprint by the fingerprint processing method of the present invention.

FIGS. 3 and 4 are diagrammatic representations of a segment of a digitized fingerprint image, derived from optical scanning of a fingerprint by the scanner 27 or 28. FIG. 3 illustrates the fingerprint image 2 prior to processing by the method 1, while FIG. 4 shows a "bordered" fingerprint image segment 42 after border processing by the method 1. The live fingerprint scanner 27 initially digitizes an image of a live finger pad pressed against a scanning window (not shown) at an eight bit gray scale resolution, yielding 256 levels of luminance between darkest black or off and brightest white. The program 34 converts the gray scale image to a black and white image by thresholding. In FIGS. 3 and 4, the fingerprint ridges 5 are represented as white pixels 44, while the valleys 6 and background 45 areas are represented as black pixels 46 (represented in the figures by crosshatching).

The scanned image 2 consists of a rectangular array 512 pixels wide by 480 pixels high. Each of the pixels 44 and 46 is addressable by conventional Cartesian coordinates (X,Y) with an origin (0,0) at the upper left (as viewed in FIG. 3) and proceeding to (511,479) at the lower right. An image data file storing data representing the image 2 stores a color byte for each pixel. Although eight bits are available for representing the pixel colors, the valleys 6 and background are represented by a valley color, such as black which has the hexadecimal value 00 h, while the ridges 5 are represented by "dark" white which has the hexadecimal value of 07 h. It should be noted that the representation of the ridge pixels 44 as white and the valley and background pixels 46 as black is arbitrary. The conversion between Cartesian coordinates of the pixels 44 and 46 and the addresses or offsets within the data file storing the array is well within the skill of ordinary graphics programmers and will not be detailed herein.

In the method 1 of the present invention, it is convenient to refer to absolute directions in relation to the image 2 in terms other than positive and negative X and Y directions. In FIG. 3, an N or north vector refers to the negative Y direction (up, as viewed); an S or south vector refers to the positive Y direction (down, as viewed); an E or east vector refers to the positive X direction (right, as viewed); and a W or west vector refers to the negative direction (left, as viewed).

The ridges 5 and valleys 6 are referred to generically as elements or elongated elements 47 of the image 2. Identifiable characteristics of the elements 47 are referred to generically as features 48 of the elements and include top spurs 49 and bottom spurs 50 of the ridges 5, the bifurcations 3 and ridge endings 4, pores 51, and islands 52. Bifurcations 3 include divergences 53 and convergences 54. Whether a bifurcation 3 is a divergence 53 or a convergence 54 depends on the direction of processing at the time. It should be noted that all features 48 associated with the ridges 5 have complementary features 48 of the valleys 6. Thus, top and bottom spurs of the ridges 5 are respectively bottom and top spurs of the valleys 6; ridge endings are valley bifurcations; ridge bifurcations are valley endings; ridge islands are valley pores; and ridge pores are valley islands. As will be explained in detail below, the identification of the minutiae of the image 2 involves the analysis of ridge border pixels 56 and valley border pixels 57 occurring along opposite borders 58 and 59 between the ridges 5 and valleys 6 of the image 2.

Figure 2:
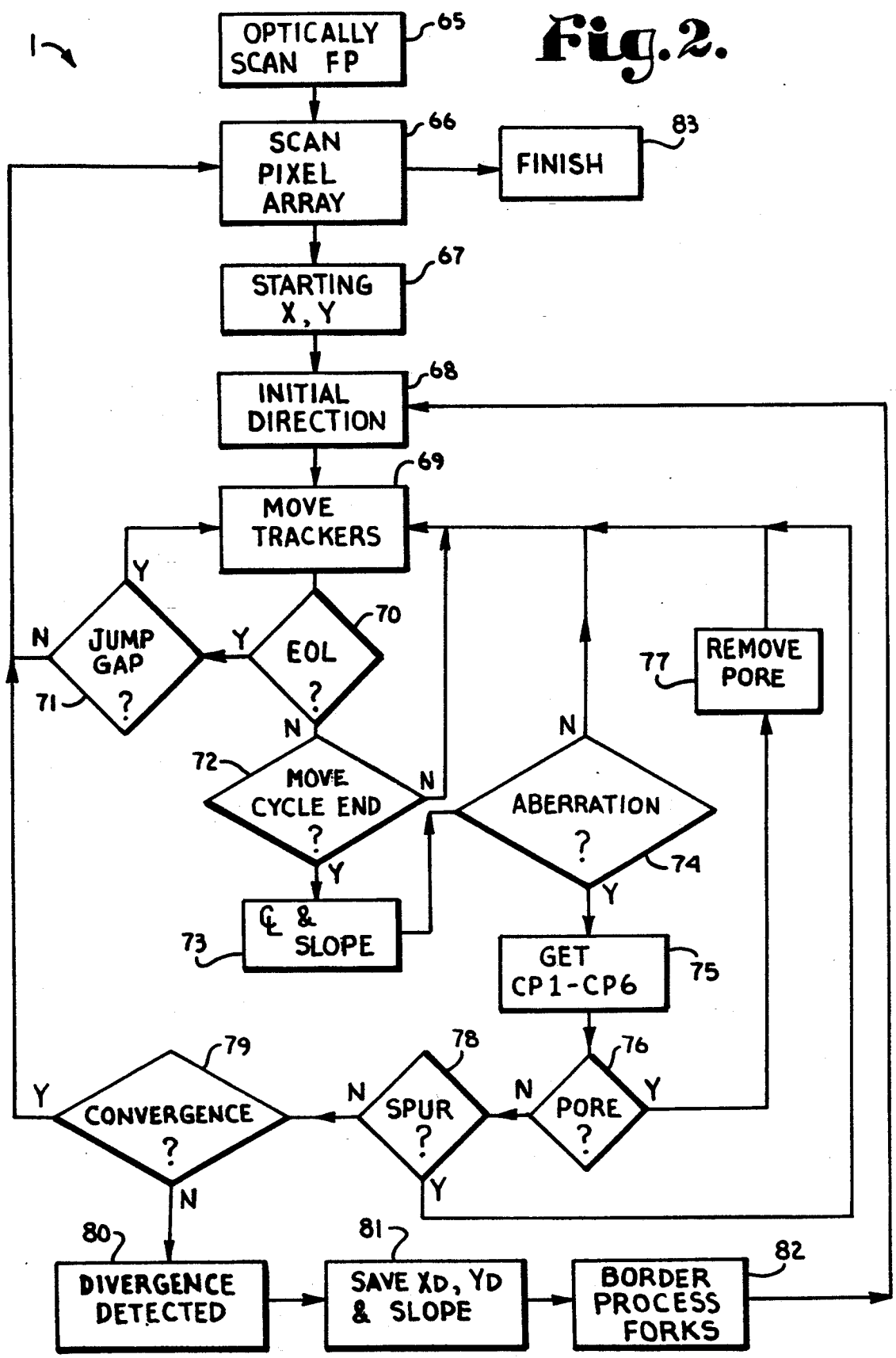
FIG. 2 is a flow diagram illustrating the principal steps of the fingerprint processing method of the present invention.

FIG. 2 diagrammatically illustrates the principal steps of the fingerprint processing method 1 of the present invention. The method 1 begins with the optical scanning 65 of a live fingerprint (FP) or inked image of a fingerprint. The method 1 uses the same sequence of steps for analyzing ridges 5 and valleys 6. After all the ridges 5 have been analyzed, the method 1 processes the valleys 6. The image array 2 is read sequentially or "scanned" at 66 until a transition from black to white is detected, indicating the presence of an unprocessed ridge 5. Starting X and Y coordinates of tracker pixels T1 and T2 (FIG. 13) are determined at 67. An initial direction of processing for the tracker pixels is determined at block 68. Referring to FIG. 3, normal border processing is defined herein as processing in a direction generally from left to right as viewed, while inverse border processing is defined as generally from right to left as viewed. Additionally, it is necessary to determine an initial direction of travel of the tracker pixels T1 and T2 in terms of the absolute directions of the north, east, south, and west vectors in order to retain the trackers T1 and T2 adjacent the borders.

At block 69, the tracker pixels T1 and T2 are moved in movement cycles to process the borders 58 and 59 of the ridges 5. After each tracker pixel T1 or T2 is moved one pixel location, a check is made to determine if the trackers are at the end 4 of a ridge 5 (EOL or end of line) by checking if the X and Y coordinates of the trackers T1 and T2 are the same. If a ridge ending 4 is detected, an attempt is made at 71 to jump a gap between the current ridge and another ridge, if it is within a selected proximity. If the gap can be jumped, control is returned to the move trackers routine at 69. If the gap cannot be jumped, the pixel scanning routine 66 is resumed where it left off, below the just previously bordered ridge. If a ridge ending 4 was not detected at 70, a check is made at 72 to determine if the tracker pixels have completed one movement cycle. The movement cycles cause the tracker pixels to move in such coordination as to minimize the distance between T1 and T2 while still following the opposite borders 58 and 59. If the end of a movement cycle is not detected at 72, the trackers are again moved at 69. If a movement cycle has been completed at 72, the current midpoint between the trackers T1 and T2 is determined to generate a centerline (C superimposed on L) between the borders 58 and 59 at block 73, and the average slope of the centerline is calculated.

Next, an aberration test is conducted at 74 in which a line between the trackers T1 and T2 is checked for the presence of a black pixel. If no aberration is found at 74, control returns to the tracker moving routine at 69. If an aberration is detected at 74, six critical points CP1–CP6 in the relative vicinity of the detected black pixel are created and placed at 75, and a sequence of tests are conducted to determine the type of aberration.

The first test is a pore test at 76. If the aberration is determined to be a pore 51, the pore is bordered in ridge colored pixels at 77 to effectively remove the pore from the ridge 5, and control is returned to moving the tracker pixels at 69. If the aberration is not a pore, a top spur test and a bottom spur test are conducted at 78. If a spur 49 or 50 is detected, the spur is bordered, and control is returned to the tracker moving routine 69. If no spur is detected, a top convergence test and a bottom convergence test are conducted at 79. If a convergence 54 is detected, the process resumes scanning the pixel array at 66 below the last ridge detected. The portions of the ridge 5 in which a convergence 54 was detected will be detected by later array scanning at 66, and processing will complete at that time.

If all the other aberration tests 76, 78, and 79 fail, then a divergence 53 has been detected at 80. The X and Y coordinates of a selected one of the critical points is saved at 81 as the coordinates of the divergence $(X_D, Y_D)$ along with the slope of the centerline within a selected vicinity of the divergence 53. Thereafter, the forks of the divergence 53 are bordered at 82 which requires that a new initial direction be determined at 68.

When the ending 4 of the last ridge 5 is detected at 70 and no gap can be jumped at 71, the remainder of the background 45 of the image 2 is scanned until the last pixel at coordinates (511,479) is reached, and the process finishes ridge processing at block 83. After the ridges 5 are processed, the same steps 66–83 are used to locate and determine the slope at the minutiae of the valleys 6. The minutiae thus found are stored in the minutia location table 8 with an indication of whether the minutia is associated with a ridge or valley. The minutia location table 8 is, thus, a map of significant, identifiable features of the elements of the fingerprint image 2.

Figure 5:
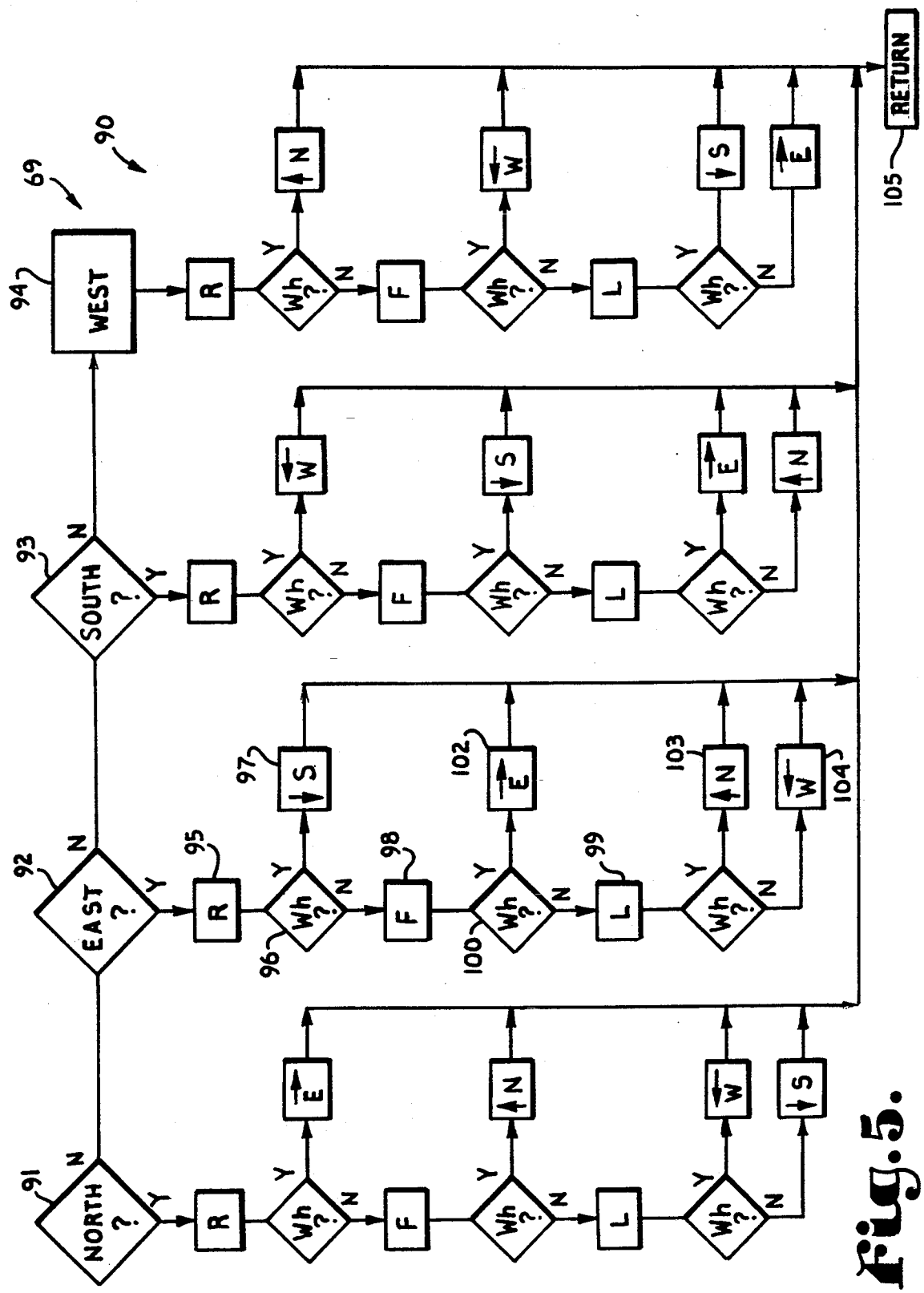
FIG. 5 is a flow diagram illustrating an RFLB (right, front, left, back) tracker pixel movement algorithm as used by the fingerprint processing method of the present invention.

The move trackers block 69 of FIG. 2 is used to move the tracker pixels T1 and T2 along the borders 58 and 59 of the ridges 5 and valleys 6 to "border process" or "border" the ridges and valleys. Since border tracking or bordering is common to many of the steps of the method 1, it will be described prior to other steps which, in ordinary practice of the method 1, would occur prior to any border tracking. The move trackers routine 69 is actually two complementary algorithms which operate in a similar manner, but in opposite mutual directions or sequences. The algorithms used in the move trackers routine 69 are in the public domain and are used for maze solving and simple outlining of black and white images. FIG. 5 illustrates the steps of a component algorithm of the move trackers routine 69 which is referred to as an RFLB algorithm 90, in which RFLB refers to Right, Front, Left, Back. The move trackers routine 69 also makes use of an LFRB routine (not shown) which stands for Left, Front, Right, Back.

The names RFLB and LFRB indicate the sequence of directions in which a tracker pixel "looks at" or checks pixel color, relative to the current direction of travel. Thus, when a tracker pixel is using an RFLB algorithm, the tracker pixel checks orthogonally adjacent pixels in a definite sequence, beginning immediately to the right and proceeding to check to the front, left, and back or behind in a counterclockwise sequence. The LFRB algorithm begins at the immediate left, and proceeds to check to the front, right, and back in a clockwise sequence.

The RFLB and LFRB algorithms are used to move the trackers along the borders 58 and 59 and proceed in such a manner as to maintain them adjacent the borders. If the incorrect sequence of checking were selected in processing a ridge 5, for example, the trackers would wander out into the ridge pixels 44 and the program 34 would loop indefinitely. In the method 1, the trackers T1 and T2 use opposite algorithms which depend on whether the method 1 is processing normally (generally west to east, as viewed in FIG. 3) or inversely (generally east to west, as viewed in FIG. 3). In the method 1, the LFRB and RFLB algorithms are used to move the trackers T1 and T2 respectively during normal processing; and the RFLB and LFRB algorithms are used to move the trackers T1 and T2 respectively during inverse processing.

In FIG. 5, the terms north, east, south, and west and the associated directional vectors N, E, S, and W with appropriate arrows are absolute directions, as described with reference to FIG. 3. The directions right, front, left, and back and their associated symbols R, F, L, and B are relative to the current direction of travel, which is the direction a tracker pixel moved last.

The RFLB algorithm 90 of FIG. 5 first determines the current direction of a tracker pixel as north at block 91, east at block 92, south at block 93, or west at block 94. Assuming the current direction is east, the algorithm 90 looks to the pixel on the right at block 95 and checks to see if that pixel is white at block 96 ("Wh?"). If so, the tracker pixel moves to the right of its current position which is to the south at block 97 in an absolute direction, and changes the current direction to south.

In a similar manner, the tracker pixel looks sequentially to the front at block 98 and to the left at block 99, and conducts the white test at blocks 100 and 101. If the white test to the front 100 succeeds, the tracker moves to the east at block 102, or to the north at 103 if the white test to the left 101 succeeds. If all three white tests 96, 100, and 101 fail, the direction defaults to the back (not shown) and moves to the west at 104. Each time the tracker pixel moves, its current direction is changed to the direction in which it has just moved, and a numeric value is stored in the pixel which has been exited to indicate either a ridge border pixel 56 or a valley border pixel 57, depending on whether ridges 5 or valleys 6 are being processed or "bordered". This prevents the scan pixels routine 66 of FIG. 2 from subsequently detecting a black to white or white to black transition. Processing thereafter returns at 105 to the routine which called the RFLB algorithm 90. The processing from a current direction of north at 91, south at 93, and west at 94 proceeds in a similar manner. The LFRB algorithm operates in a similar manner, with checking in sequence to the left, front, right, and back.

Figure 6A:
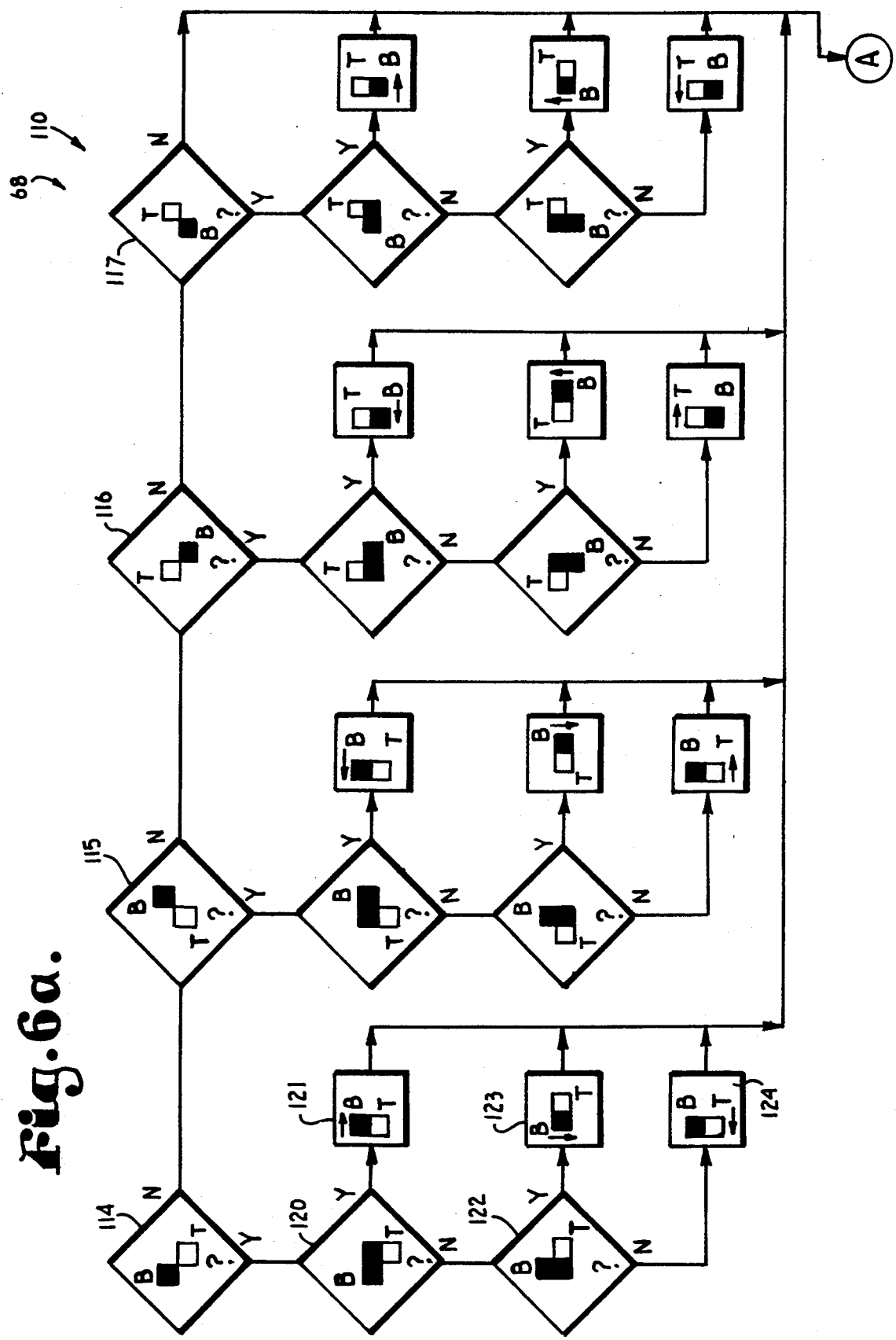
FIGS. 6a and 6b are portions of a flow diagram illustrating a routine for determining the beginning direction of tracker pixels in the fingerprint processing method of the present invention.
Figure 6B:
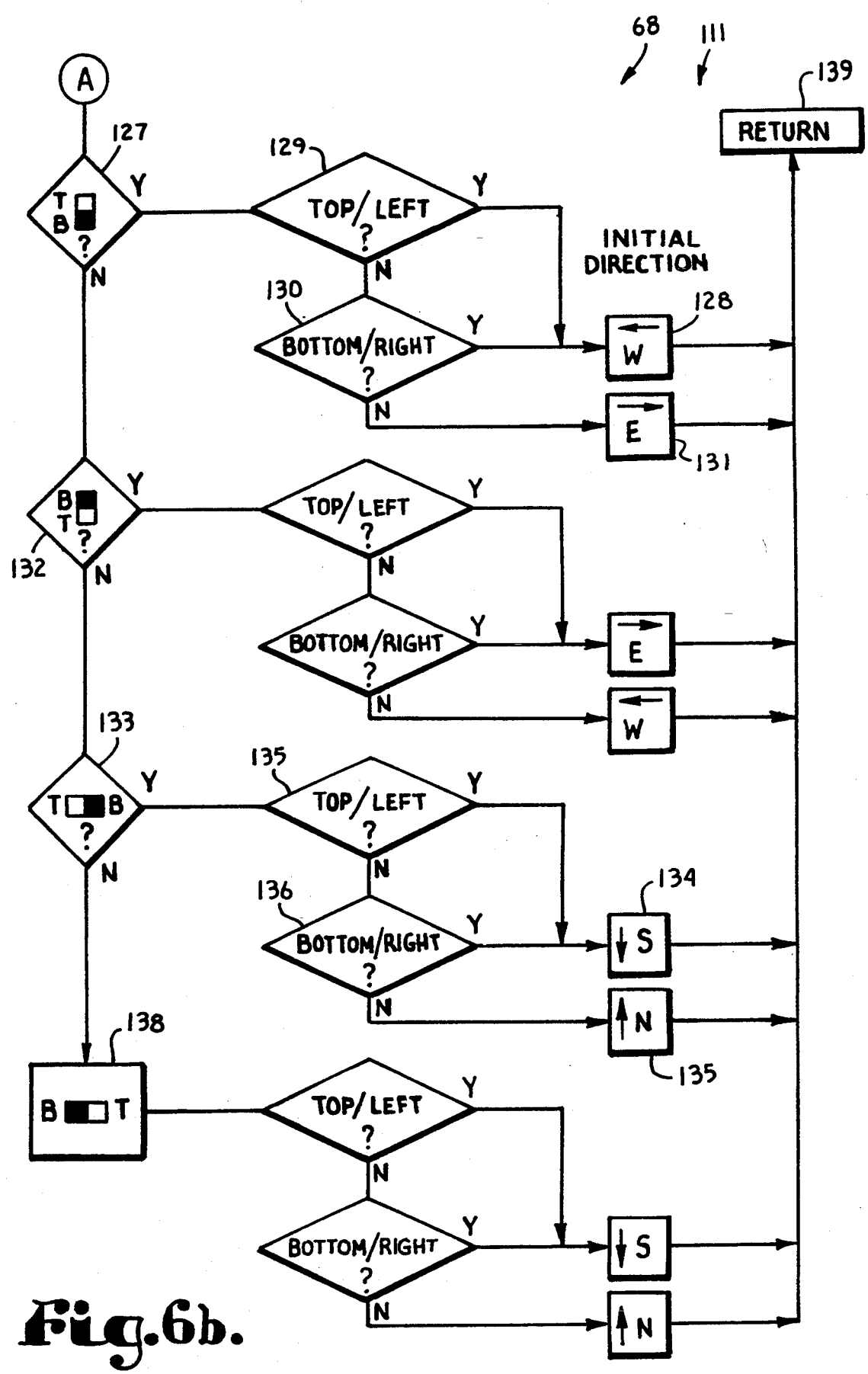

FIGS. 6a and 6b illustrate details of the initial direction routine 68 of FIG. 2 for determining the initial direction of movement of the trackers T1 and T2. The initial direction routine 68 is entered after a ridge 5 or valley 6 is detected by the array scanning routine 66 and starting coordinates are determined at 67 or after a divergence 53 is detected at 80 and the forks of the divergence are to be bordered at 82. The steps in FIG. 6a constitute a diagonal testing routine 110, while the steps in FIG. 6b constitute an orthogonal testing routine 111. The initial direction routine 68 makes use of a white tracker pixel T and an adjacent black pixel B and requires the direction of processing or general path of travel (right for normal, left for inverse) and an indication of whether the current border is on the top or bottom of the ridge 5 or valley 6.

The diagonal routine 110 tests for a diagonal relationship of the black pixel B to the white tracker pixel T as above/left at 114, above/right at 115, below/right at 116, or below/left at 117. If the diagonal tests fail at 114–117, the black pixel B is orthogonally positioned with respect to the tracker pixel T, that is, immediately below, above, to the right, or to the left of the tracker pixel T, and processing is diverted to the orthogonal testing routine 111 through a connection symbolized by a circled A. If the diagonal tests 114–117 succeed, the intervening orthogonal pixels between the black pixel B and tracker pixel T are tested in a selected order to see if they are black, with priority given to the intervening pixel above or below the tracker pixel T. If the tested pixel is black, the black pixel B is moved to that position and control passes to the orthogonal test 111. If neither intervening pixel test succeeds, the tracker pixel T is moved into a vertical relationship with the black pixel B.

For example, if the black pixel B is above/left of the tracker pixel T at 114, the intervening pixel above the tracker pixel T is tested at 120. If it is black, the black pixel B is moved above the tracker pixel T at 121. If not, the pixel to the left of the tracker pixel T is tested at 122. If it is black, the black pixel B is moved to the left of the tracker pixel T at 123. If both tests fail, the tracker pixel T is moved below the black pixel B at 124 and control passes to the orthogonal test 111. The tests proceeding from diagonal tests 115–117 operate in a similar manner. The diagonal routine 110, in effect, converts the diagonal relationship between the black pixel B and the tracker pixel T into an orthogonal relationship, and the orthogonal routine 111 is entered at the circled A.

In FIG. 6b, the orthogonal routine 111 determines the initial direction of travel based on the orthogonal relationship of the black pixel B and the tracker pixel T in combination with the border and processing direction under consideration. If the black pixel B is below the tracker pixel T at 127, the initial direction is west at 128 if the border/path combination is either top/left at 129 or bottom/right at 130. Otherwise, the initial direction is east at 131. If the black pixel B is above the tracker pixel T at 132, the initial directions are reversed under the same conditions as applied in tests at 129 and 130. Similarly, if the black pixel B is to the right of the tracker pixel T at 133, the initial direction is south at 134 if the border/path combination is top/left at 135 or bottom/right at 136. Otherwise, the initial direction is north at 137. If the black pixel B is to the left of the tracker pixel T at 138, the directions are reversed under the same conditions as applied in tests at 135 and 136. After the initial direction is determined for a tracker pixel by the routine 68, control is passed at return 139 to the move trackers routine 69, which is thereafter able to correctly calculate the direction of travel of the trackers.

Figure 7:
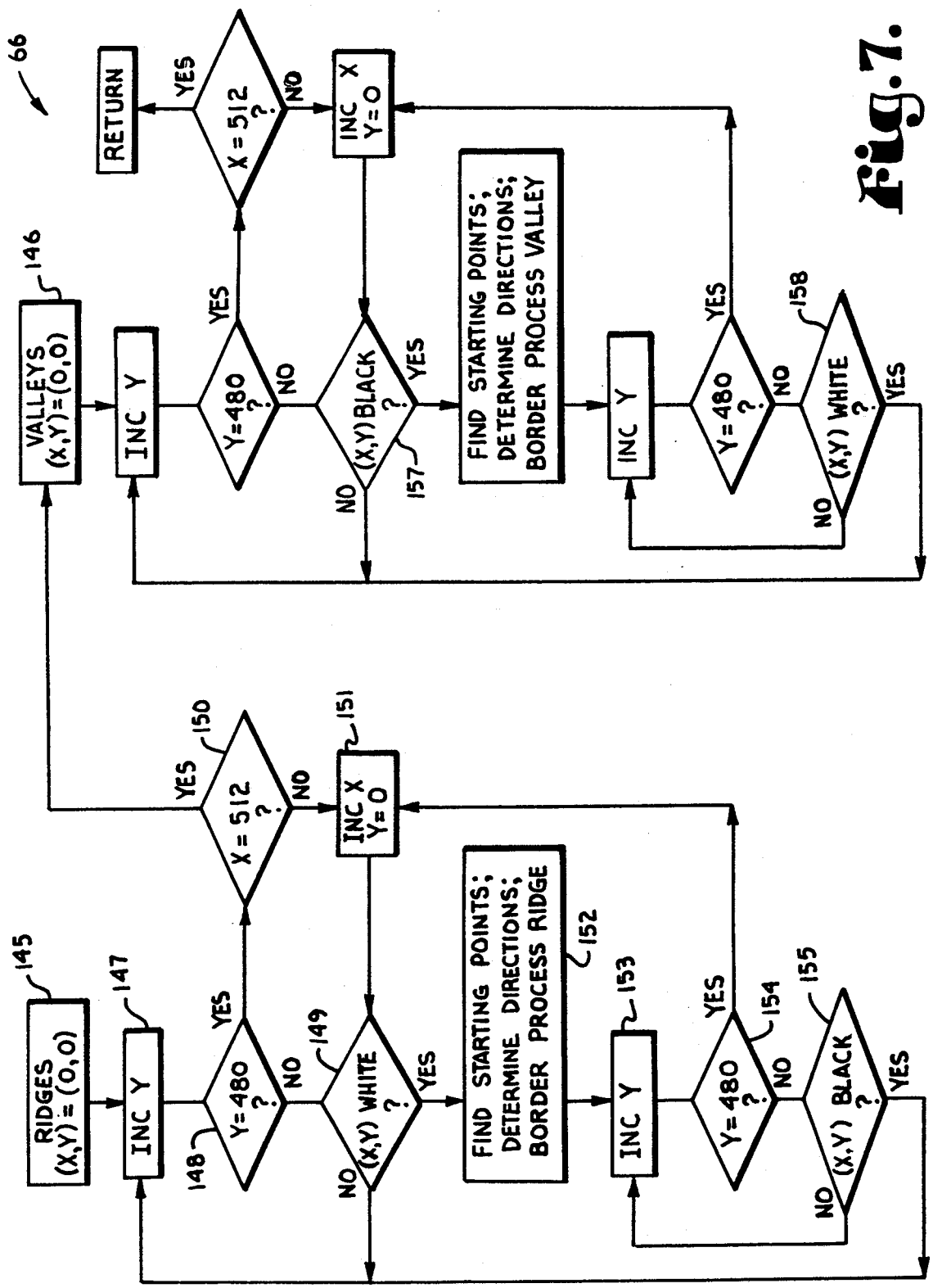
FIG. 7 is a flow diagram illustrating an image scanning routine of the fingerprint processing method of the present invention.

FIG. 7 illustrates details of the scan pixel or array scanning routine 66 of FIG. 2. The routine 66 at block 145 first scans the image array 2 for ridges 5 beginning with the coordinates initialized to (0,0), and when all the ridges 5 have been located and processed begins at block 146 to scan for valleys 6. Proceeding from block 145, the scan moves downward one pixel by incrementing the Y coordinate at 147 and checks at 148 to see if the lower margin of the array 2 has been reached, which is true if Y=480. If not, the color of the current pixel is tested at 149 to see if it is white. If not, the routine 66 loops back through steps 147–149 until either a black pixel is detected by test 149 or the lower margin of the array has been reached. If no white pixel has been found in a vertical column of pixels, the routine 66 branches to a test 150 to see if the rightmost column of pixels of the array 2 has been reached by testing if X=512. If so, the ridge scan has been completed, and the routine 66 branches to the valley scan at block 146. If the ridge scan has not been completed, the X coordinate is incremented, the Y coordinate is set to zero at 151, and testing for white pixels at 149 resumes.

When a white pixel is detected at 149, indicating an unprocessed ridge or portion of a ridge, the scan coordinates are saved, and at 152 the ridge 5 is border processed by performing step 67 of FIG. 2 to find the starting coordinates and step 68 to find an initial direction. After the ridge has been bordered in step 152, by finding either a ridge ending 4 or a convergence 54, the scanning routine 66 resumes where it left off. The saved Y coordinate is incremented at 153, a lower margin test is conducted at 154, and at 155 a pixel color test is conducted to see if the current pixel is black. If not, the routine 66 loops through steps 153–155 until the routine 66 scans past the ridge 5 which has just been processed. When a black pixel is detected at 155, the routine 66 resumes the scan for ridges 5 at 147, and the ridge scan continues in a manner as described above.

The valley scan beginning at block 146 proceeds in substantially the same manner as the ridge scan 145, except that at 157 the pixel color test is for a black color instead of the white pixel test at corresponding step 149 and at 158 the pixel color test is for a white color instead of the black pixel test at 155.

Figure 8:
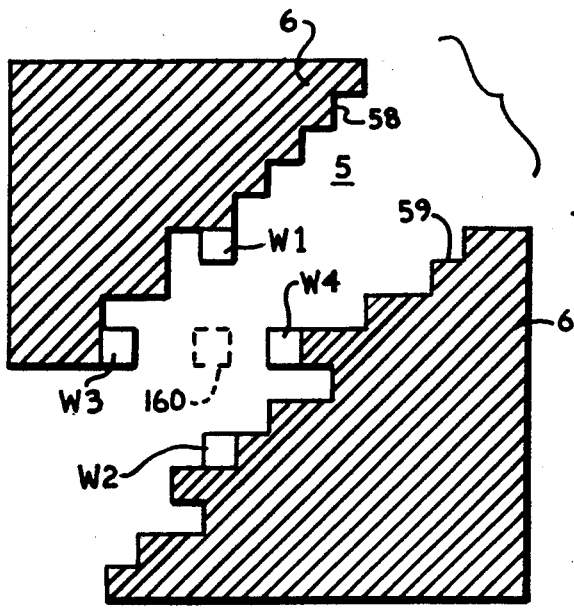
FIG. 8 is a fragmentary pixel diagram illustrating a process for finding starting signposts of a fingerprint ridge in the fingerprint processing method of the present invention.
Figure 9:
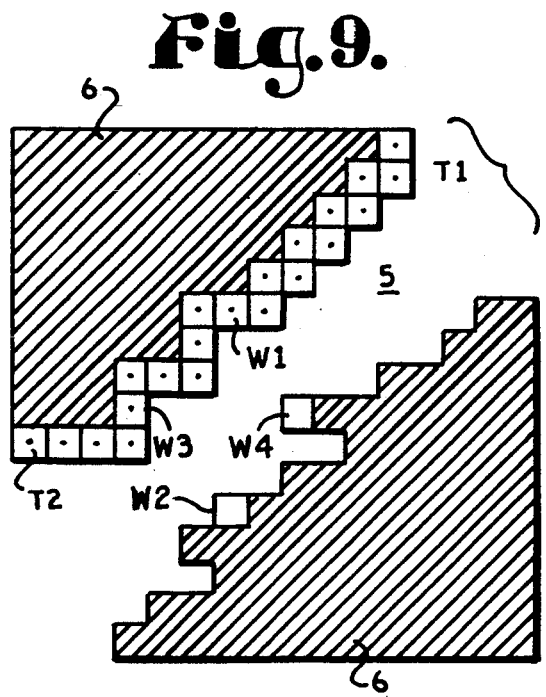
FIG. 9 is a fragmentary pixel diagram for eliminating signposts in the fingerprint processing method of the present invention.

FIGS. 8 and 9 graphically illustrate the process 67 for determining the starting coordinates of the border trackers T1 and T2. When the array scanning routine 66 detects a white pixel at the border 58 of the ridge 5, at step 149 (FIG. 7), the white pixel detected is designated W1. The routine 67 continues to scan downward until it detects the last white pixel adjacent the border 59, which is designated W2. A midpoint 160 between the pixels W1 and W2 is calculated and recorded. The routine 67 scans to the left from the midpoint 160 (as viewed in FIG. 8) and designates the last white pixel adjacent the border 58 as W3. Similarly, the routine 67 scans right from the midpoint 160 and designates the last white pixel adjacent the border 59 as W4. The variables W1, W2, W3, and W4 are defined as starting signposts or signpost variables.

Figure 10:
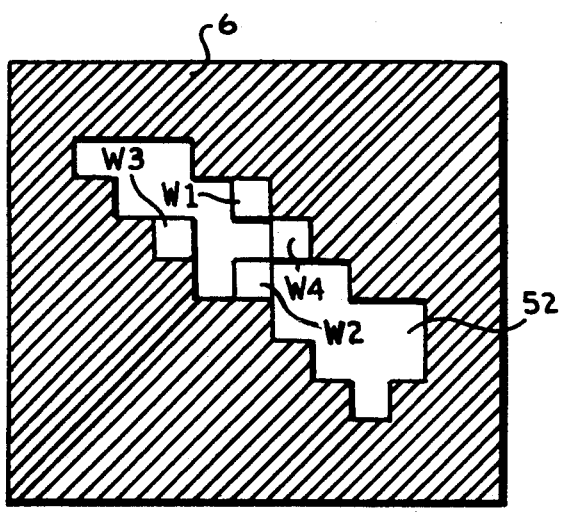
FIG. 10 is fragmentary pixel diagram for finding the starting signposts of an island feature in the fingerprint processing method of the present invention.

When the array scanning routine 66 detects a white pixel, it is not known if a real ridge 5 has been detected or merely an island 52 (FIGS. 3 and 10), without further testing. An island is a very short ridge and is considered relatively insignificant as far as fingerprint processing is concerned, such that it is not desirable to clutter the minutia table 8 with data regarding islands, especially since there may be a large number of islands in a given fingerprint.

Figure 11:
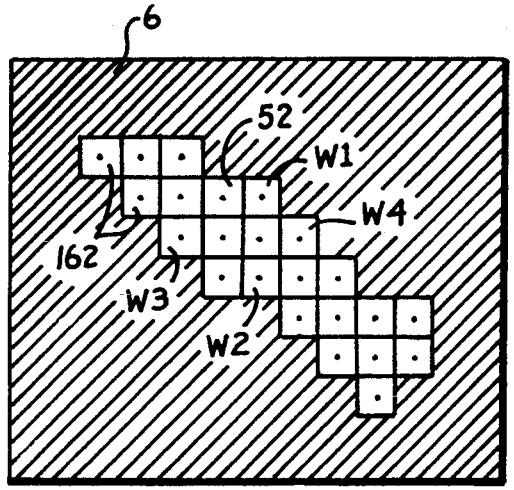
FIG. 11 is a fragmentary pixel diagram illustrating the border processing of an island in the fingerprint processing method of the present invention.

In general, the trackers T1 and T2 are initialized at W1, and border processing occurs according to the appropriate RFLB or LFRB routine described above, moving the trackers T1 and T2 in opposite directions. After each move, the coordinates of T1 and T2 are compared. As each signpost W2–W4 is encountered, the coordinates of the encountered signpost are set to (0,0), thereby eliminating the encountered signpost. If the coordinates of T1 equal those of T2 within a selected number moves of both trackers, such as fifteen, the element being bordered is an island 52. As the island is bordered, the coordinates of island border pixels 162 thereof (FIG. 11) are recorded. If an island 52 is detected, the island border pixels 162 are changed to the border color, as indicated by the dotted pixels 162 in FIG. 11. Thus, subsequent array scans by the routine 66 (FIGS. 2 and 7) will not attempt to reprocess an island which has been bordered, since there will be no black to white transition detected for a previously processed island 52.

If the starting coordinates routine 67 does not detect an island 52, then a normal ridge 5 is indicated and the trackers T1 and T2 might end up in a relationship similar to that shown in FIG. 9 (although FIG. 9 does not actually show T1 and T2 to have moved fifteen steps). Alternatively, depending on where the array scan 66 encounters a ridge 5, T2 or T1 might travel around the end of a ridge and eliminate W2 or W4. Normally, T1 will be initialized at W1 and T2 will be initialized at whichever one of W2 or W4 has not been eliminated. If neither has been eliminated, T2 will be initialized at W2. Alternatively, other factors can be taken into consideration in selecting the starting positions of T1 and T2. The initial positions of T1 and T2 are recorded, and bordering begins, processing generally to the left as viewed in FIG. 9. When a ridge ending 4 is encountered which cannot be gap jumped or which converges, the program 34 returns the trackers T1 and T2 to the positions from which they started bordering to the left, and bordering generally to the right begins.

Figure 12:
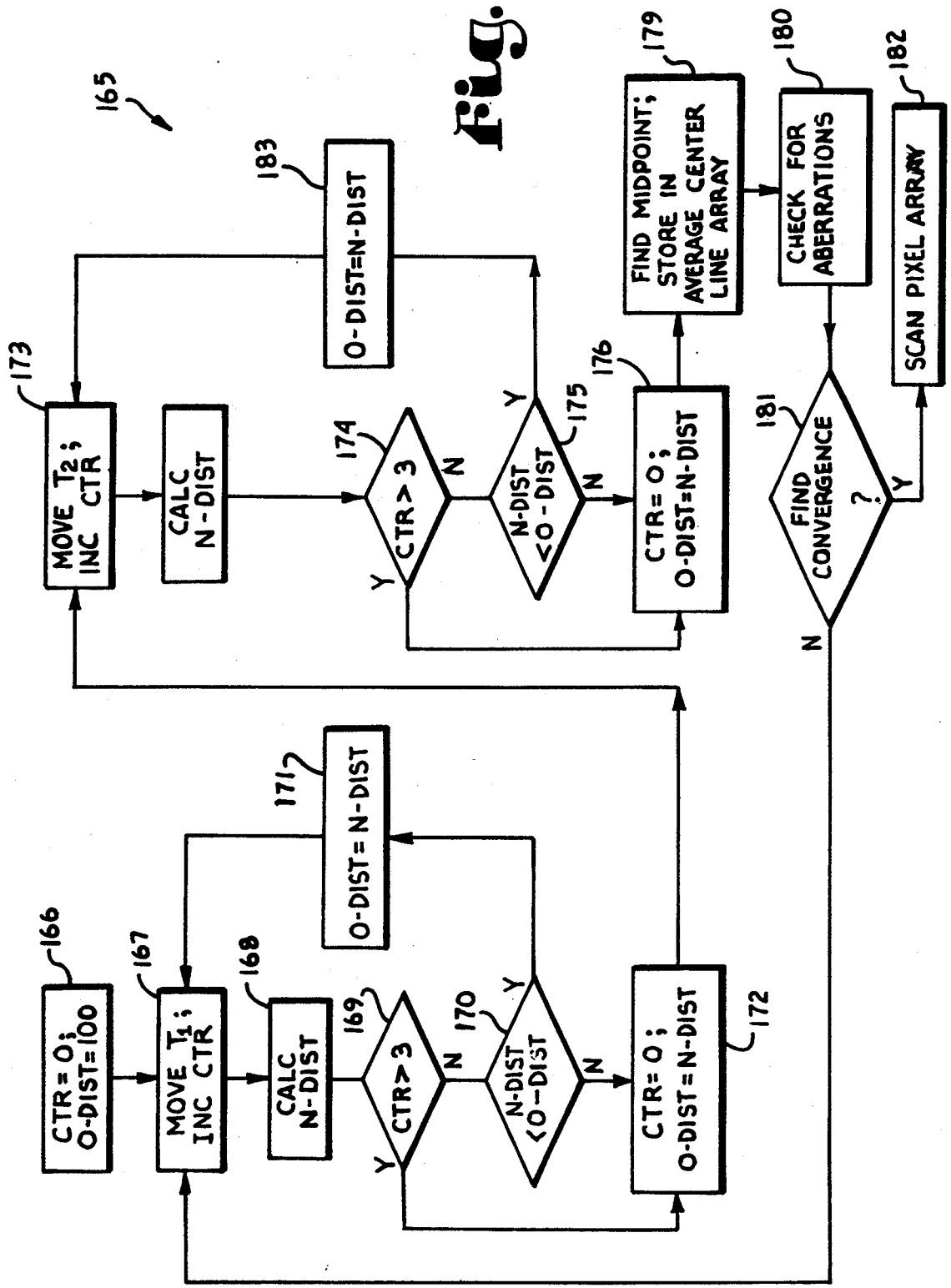
FIG. 12 is a flow diagram illustrating a routine for keeping border trackers parallel in the fingerprint processing method of the present invention.

As the trackers T1 and T2 are bordering a ridge 5, it is desirable to maintain a minimum distance between the trackers. If the trackers were allowed to always move in equal steps, it is possible for one tracker to advance significantly ahead of the other, especially along a ridge having a sharp turn. Such an occurrence could cause a false detection of an "aberration" (detailed below). FIG. 12 illustrates a routine 165 which keeps the trackers T1 and T2 "parallel" or at a minimum separation distance. The parallel routine 165 begins at 166 by initializing a tracker move counter (CTR) at zero and an old distance variable (O-DIST) at a value of 100. At 167, T1 is moved one pixel in the bordering routine, and the counter is incremented. At 168, a new distance (N-DIST) between T1 and T2 is calculated, using the Pythagorean theorem, wherein the distance between T1 and T2 is equal to the square root of the sum of the difference of corresponding coordinates of T1 and T2.

At 169, if the move counter is at less than three and the new distance is less than the old distance at 170, the old distance is set to the current new distance 171, and T1 is moved again at 167. When the move counter reaches three, or if the new distance is equal to or greater than the old distance, the move counter is reset to zero and the old distance is set to the new distance at 172, and T2 is moved one pixel at 173. The movement of T2 is conducted under the same criteria as T1. T2 is moved a maximum of three times as long as the distance between T1 and T2 is decreasing. If three moves of T2 have occurred at 174 or if the distance has not decreased at 175, a movement cycle of the trackers has completed at 176.

Whenever a tracker movement cycle is completed at 176, the routine 165 causes the determination at 179 of a midpoint between T1 and T2, and an aberration check is conducted at 180 (both of which will be detailed further below). If no aberration is found or if a detected aberration is not a convergence 54 by the aberration check at 180, at 181 the routine 165 returns to 167 to again move the trackers T1 and T2 to continue bordering the ridge or to border a spur or a divergence if necessary. If a convergence is found at 181, the routine 165 exits at 182 to the scan pixel array routine 66 (FIG. 2). Although not shown in FIG. 12, after each movement of T1 or T2, the coordinates of T1 and T2 are compared to determine if a possible ridge ending 4 has been encountered. Such a line ending test 70 (FIG. 2) could occur between block 171 and 167 or between block 183 and 173. If no ridge ending is detected, the appropriate tracker T1 or T2 is again moved.

Figure 13:
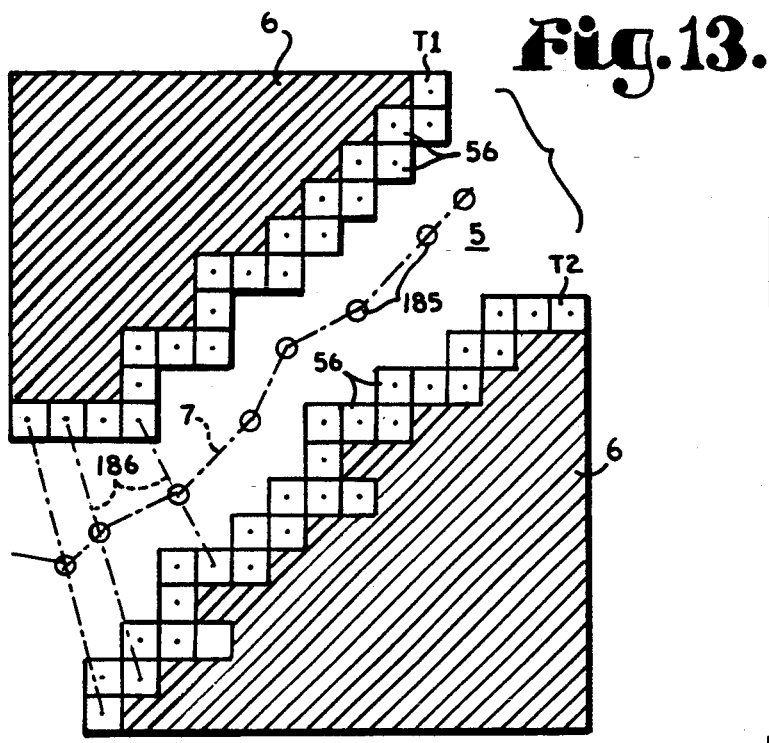
FIG. 13 is a fragmentary pixel diagram illustrating the determination of the average centerline of a ridge of a fingerprint in the fingerprint processing method of the present invention.
Figure 14:
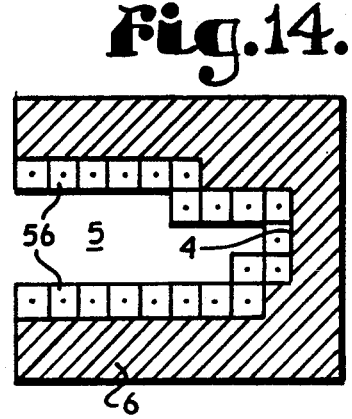
FIG. 14 is a fragmentary pixel diagram illustrating a process for detecting a line or ridge ending in the fingerprint processing method of the present invention.

FIG. 13 illustrates the determination of the midpoints 185 of inter-tracker distance lines 186 between the trackers T1 and T2, the midpoints being connected to form the centerline 7 of the ridge 5. In general, the midpoint 185 of an inter-tracker line 186 is calculated as one-half the difference of corresponding X or Y coordinates of the trackers T1 and T2. The coordinates of the midpoints 185 are stored in the midpoint array 37 (FIG. 1) which is also known as the average centerline array. After a selected number of midpoints, such as ten, have been stored in the array 37, an average slope of the centerline 7 of a particular ridge is determined using the least squares linear regression process. As each slope is calculated, it will be stored in the slope matrix 36 (FIG. 1).

Referring to FIG. 3, the fingerprint image array 2 is divided by a slope segment grid 188, each segment of which, in the illustrated method 1, has dimensions of twelve pixels in the X and Y directions. The slope matrix 36 is divided into segments corresponding to the grid 188. Each calculated slope is stored in the matrix segment corresponding to the position on the image 2 from which the slope is derived. The correct segment is found from the integer portion of the quotient resulting from dividing each of the coordinates of the last midpoint 185 by the pixel dimensions of a slope grid segment, which is twelve by twelve. When the entire image 2 has been bordered, the slope in each matrix segment is averaged by dividing the sum of the slopes stored in the matrix segment by the number of slope entries. If a segment is empty of slope values, the average slope of the empty segment is found by averaging the slopes of adjacent segments having a valid average slope.

Figure 15:
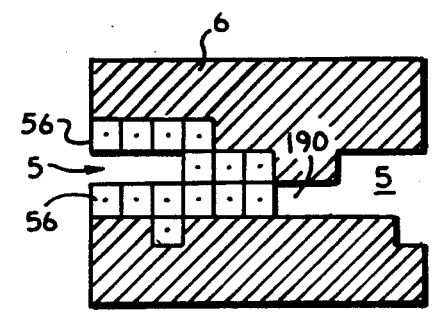
FIG. 15 is a fragmentary pixel diagram illustrating processing at a line ending which is connected to another line ending by a single pixel or line of pixels in the fingerprint processing method of the present invention.

FIGS. 14-17 illustrate processing associated with a ridge ending 4. After each tracker T1 or T2 has moved one step in bordering, the corresponding coordinates of T1 and T2 are compared. If T1 and T2 occupy the same location, a possible ridge ending 4 is indicated, and a true-ending test is conducted. Referring to FIG. 15, it is possible for two ridges 5 to be connected by a single line of pixels 190 which would cause the line ending test 70 (FIG. 2) to indicate a ridge ending. The true-ending test moves tracker T1 three steps in the current bordering direction and, if only border pixels 56 are encountered, as they would in FIG. 14, the true-ending test passes. If so, control is returned to the gap jump routine 71 (FIG. 2). If any ridge pixels 44, such as the connecting pixels 190, are detected, the true-ending test fails, and border processing resumes. The line ending test 70 and true-ending test might have to be repeated a number of times before the trackers T1 and T2 enter the main portion of the connected ridges 5.

Figure 16:
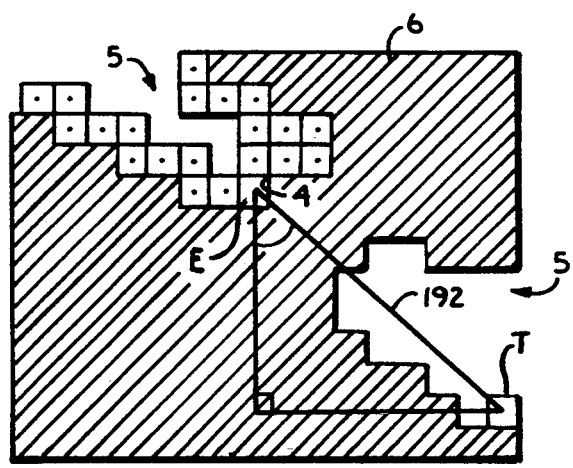
FIG. 16 is a fragmentary pixel diagram illustrating processing at a line ending to determine if a gap to another ridge can be made in the fingerprint processing method of the present invention.
Figure 17:
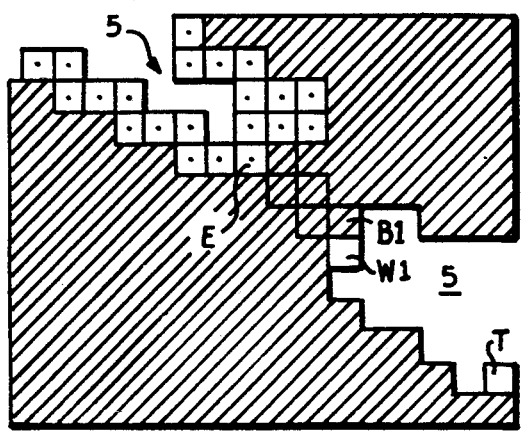
FIG. 17 is a fragmentary pixel diagram illustrating a process for jumping a gap between endings of ridges in the fingerprint processing method of the present invention.

FIGS. 16 and 17 graphically illustrate the gap jump routine 71 (FIG. 2) in which it is determined if there is another ridge 5 within a selected distance of a true ridge ending 4, if the average centerline array 37 has at least a selected number of entries, such as six. From a ridge ending pixel E, at which Ti=T2, a target pixel T is located in the direction of the current slope at a selected distance from pixel E. The routine 71 will use Bresenham's algorithm to move from pixel E toward pixel T, one pixel at a time. Bresenham's algorithm is a public domain algorithm which specifies the sequence of pixels which constitute a line at any angle on a pixel array, given the end pixels of the line. If a white pixel W1 (FIG. 17) is detected before the target pixel T is reached, T1 and T2 will be initialized at W1. The average centerline will be drawn from the end point E to W1. The new ridge 5 will be bordered beginning at W1. If the jump is not successful, the slope of a gap jump line 192 to the target pixel T will be increased and then decreased, in further attempts to find a white pixel W1, and the gap jump procedures described will be repeated. If W1 is not found in the three attempts, the routine 71 will be exited and control will be returned to the array scanning routine 66.

After both trackers T1 and T2 have completed one movement cycle at step 72 and the midpoint 185 and slope have been determined in step 73, every point along an aberration test line 195 (FIG. 18) between the trackers T1 and T2 will be color tested for aberrations by the aberration test 74 (FIG. 2). The line 195 is designated according to the Bresenham algorithm, as referred to above. During ridge processing, an aberration is detected if any black pixel occurs along the test line 195. If no aberration is detected, the aberration test 74 is exited, and the trackers resume movement at 69 in FIG. 2.

FIGS. 18 and 19 graphically illustrate the aberration test line 195 and the set up of critical points CP1-CP6, as called for at 75 in FIG. 2. The first critical point CP1 is the tracker T1. CP2 is the "first black" pixel detected by the aberration test 74. The test 74 backs up one pixel along the line 195 from CP2 toward T1 to find the "first white" pixel before CP2, which is designated CP3. The tracker T2 is designated CP4. The test 74 finds CP5 as the "last black" pixel from T1 to T2. Finally, CP6 is the "last white" pixel and is found by moving one pixel along the line 195 toward T2 from CP5.

After the critical points are set up, a sequence of aberration tests are conducted to determine the type of aberration present. The sequence of aberration tests are, in effect, a "stop" sequence in that as soon as one of the aberration tests succeeds, the sequence is exited and specific actions occur according to the type of aberration identified. All the aberration-type tests are similar in that a starting location is selected, after which the ridge 5 or valley 6 is border processed forward in the general direction that was current when the aberration test 74 was entered, or backward against the current direction. The following list summarizes the aberration-type tests. The test for a pore 51 begins at CP2 and borders forward toward CP2. The test for a top spur 49 begins at CP1 and borders forward toward CP6. The test for a bottom spur 50 begins at CP4 and borders forward toward CP3. The test for a top convergence 197 begins at CP1 and borders backward toward CP6. Finally, the test for a bottom convergence 198 begins at CP4 and borders backward toward CP3.

Referring to FIG. 20, the test for a pore 51 starts at CP2 and finds an initial direction of travel using the initial direction routine 68 (FIGS. 6a and 6b) and begins an attempt to track a border of the pore 51 using a temporary pore tracker TP. If CP2 is again reached within a selected number of pixel moves, such as twelve, the test for a pore 51 has succeeded. If so, every border pixel of the pore is changed to the ridge color, effectively removing it from the current ridge. Thereafter, ridge bordering resumes at 69 in FIG. 2. If remnants of the pore 51 are still present, they will be detected and removed by the process described above when bordering resumes.

Figure 21:
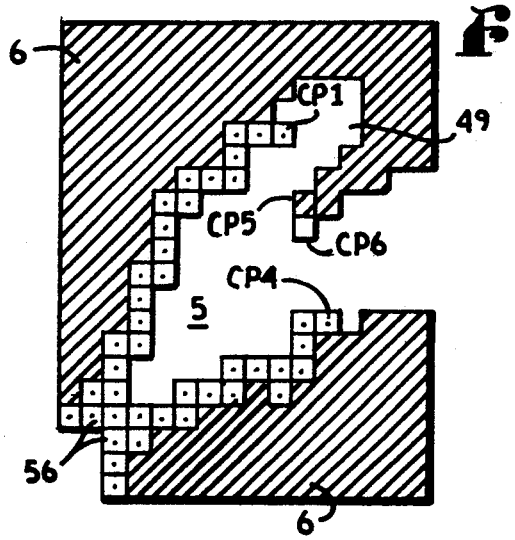
FIG. 21 is a fragmentary pixel diagram illustrating a top spur test of an aberration in the fingerprint processing method of the present invention.
Figure 22:
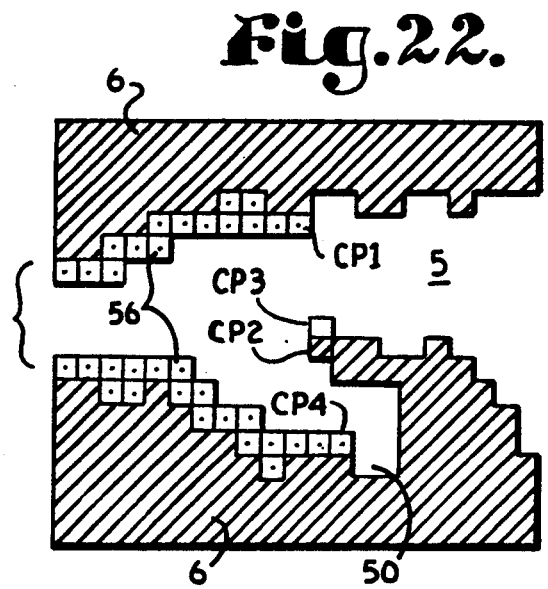
FIG. 22 is a fragmentary pixel diagram illustrating a bottom spur test of an aberration in the fingerprint processing method of the present invention.

If the pore test fails, a test for an upper spur 49 (FIG. 21) is conducted. Top spur test bordering begins at CP1, proceeding in the current direction of T1. If CP6 is reached in a selected number of pixel moves, such as fifteen, a top spur 49 has been detected. If so, T1 is moved to CP6. T2 is in the same position as when the aberration test 74 began. A midpoint 185 between T1 and T2 will be determined, and tracker moving at 69 of FIG. 2 will be resumed to continue bordering the current ridge 5. If the test for a top spur 49 fails, the test for a bottom spur 50 will be executed (FIG. 22). The bottom spur test is similar to the top spur test, except that the bottom spur test is started at CP4 and an attempt is made to reach CP3 within a selected number of pixel moves, such as fifteen. If the bottom spur test succeeds, T2 is moved to CP3 and bordering resumes after finding the current midpoint between T1 and T2.

Figure 24:
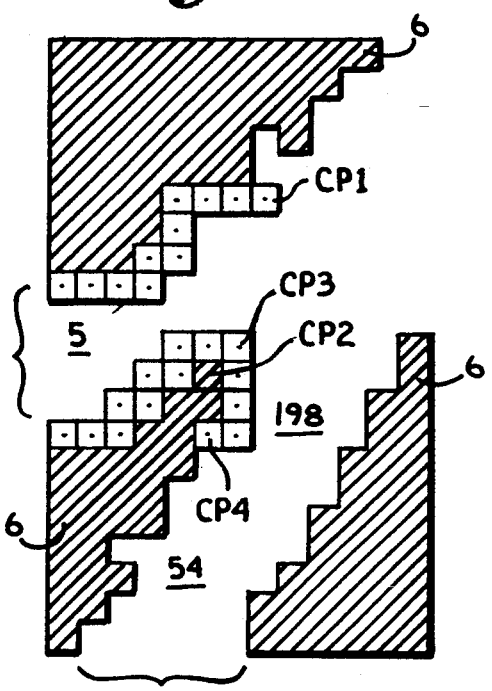
FIG. 24 is a fragmentary pixel diagram illustrating a bottom convergence test of an aberration in the fingerprint processing method of the present invention.
Figure 23:
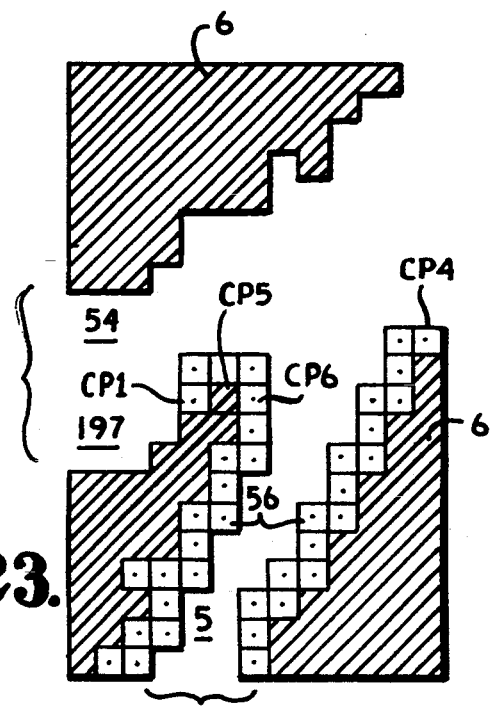
FIG. 23 is a fragmentary pixel diagram illustrating a top convergence test of an aberration in the fingerprint processing method of the present invention.

If the bottom spur test fails, a test is run for a top convergence 197 (FIG. 23). The top convergence test begins at CP1 and bordering proceeds in a direction opposite that of the current direction of T1. If CP6 is reached within a selected number of pixel moves, such as eight, a top convergence 197 has been detected. If the top convergence test fails, a test is conducted for a bottom convergence 198 (FIG. 24). The bottom convergence test is similar to the top convergence test, except that the bottom convergence test starts at CP4 and attempts to reach CP3 within eight pixel moves, bordering in a direction opposite that of the current direction of T2. If either convergence test succeeds in identifying a convergence, bordering of the current ridge 5 concludes, and the pixel array routine 66 (FIG. 2) resumes. The unprocessed portions of a ridge 5 having a convergence 54 detected therein will subsequently be detected by the array scanning routine 66, and the ridge 5 will eventually be completely bordered. Such subsequent processing will eventually detect a convergence 54 as a divergence, by inverse processing, and such a detected divergence will be stored as a ridge minutia in the minutia table 8.

Figure 25:
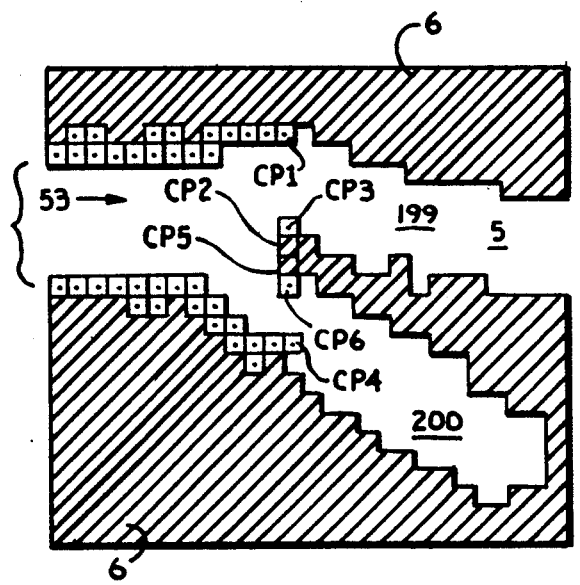
FIG. 25 is a fragmentary pixel diagram illustrating the detection of a top divergence in the fingerprint processing method of the present invention.
Figure 26:
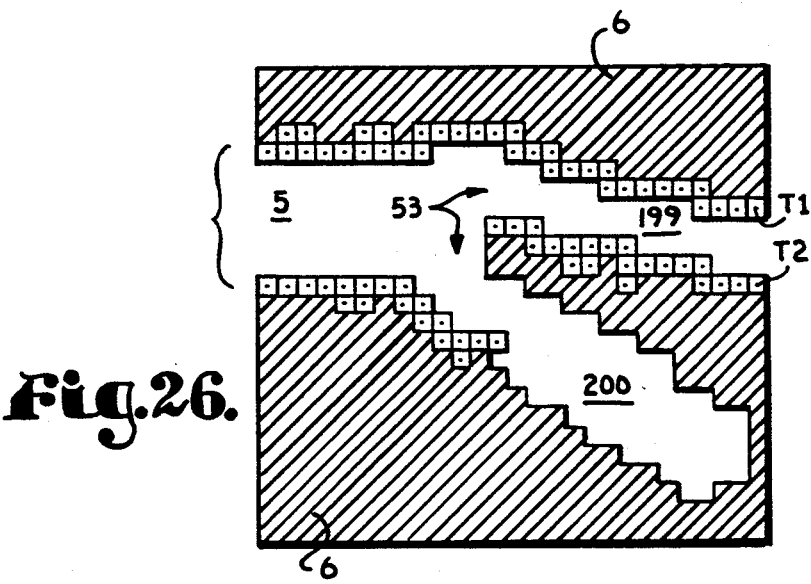
FIG. 26 is a fragmentary pixel diagram illustrating the border processing of a top divergence in the fingerprint processing method of the present invention.

If all five aberration tests fail, the aberration routine 74 will conclude that a divergence 53 has been adequately detected. The slope of the centerline 7 is calculated from the last ten midpoints 185 (FIG. 13) as the slope of the divergence 53 which is stored, along with the coordinates of CP2 (FIG. 25) as the location of the divergence, in the minutia location table 9 (FIG. 1). The forks 199 and 200 of the divergence 53 are then bordered, beginning with the top fork 199. Tracker T1 will begin bordering at its original position at CP1. A tracker T2* will start at CP3, and its initial direction will be determined according to the criteria of the initial direction routine 68 (FIGS. 6a and 6b) in conjunction with CP2. The top fork 199 will be bordered by T1 and T2*. After the top fork 199 has been bordered, the bottom fork 200 will be bordered. A tracker T1* will start at CP6 and its initial direction will be determined by the routine 68 in conjunction with CP5. The lower fork 200 will then be bordered by trackers T1* and T2 from CP4.

The centerline 7 will be drawn from the main part of the ridge 5 into the forks 199 and 200, by setting up three midpoints MP1, MP2, and MP3 (not shown). MP1 is on the centerline 7 of the main part of the current ridge 5 and is halfway between CP1 and CP4. MP2 is related to the top fork 199 and is halfway between CP1 and CP3. MP3 is related to the bottom fork 200 and is halfway between CP4 and CP6. MP1 will be connected to MP2 and MP3 to connect the centerline 7 of the main part of the ridge 5 with the centerlines (not shown) of the top and bottom forks 100 and 200. After the divergence 53 has been completely processed, control will pass to the array scanning routine 66 of FIG. 2.

After all the ridges 5 of the fingerprint image 2 are process and bordered (see FIG. 4) and the divergences 53 of the ridges located, the program 34 will process the valleys 6 using the same routines as used for the ridges 5 to locate the divergences 53 of the valleys 6, but with the color tests changed to locate the border pixels 57 (FIG. 3) of the valleys 6. When the valleys have been bordered, all the valley minutiae stored in the minutia table 8, and slope matrix 38 updated, the method 1 is finished. Data may be entered into the minutia table 8 and slope matrix 36 to identify the person from whom the fingerprint was taken, and the table 8 and matrix 36 can be used with the identify or verify program 38, as described above.

While the present invention has been described and illustrated with particular emphasis on the extraction of minutiae for the purpose of identifying individuals based on their fingerprints, the present invention is not intended to be limited solely to such use. If is foreseen that the methods of the present invention could be advantageously applied in other fields, such as optical character recognition, quality control testing of printed circuit board conductive traces, and other applications involving the graphic analysis of elongated and branched elements, and the like.

It is to be understood that while certain forms of the present invention have been illustrated and described herein, it is not to be limited to the specific forms or arrangement of parts described and shown.

What is claimed and desired to be secured by Letters Patent is as follows:

1. A method for extracting identification data identifying a selected minutia feature from a plurality of different minutia or aberration types of a generally elongated image element of an image from a rectangular image array of pixels representing said image, and comprising the steps of:
    (a) scanning said image array of pixels by a digital processor to detect border pixels defining a border of said elongated element;
    (b) determining rectangular border coordinates of said border pixels by using said processor to determine the X-Y coordinates of the detected border pixels;
    (c) calculating rectangular centerline coordinates of an average centerline of said elongated element from said border coordinates by using said processor to determine the X-Y coordinates of pixels centered between opposite border pixels of said image element;
    (d) detecting the presence of a specific selected minutia or aberration of said elongated element from said border coordinates by using said processor to test said border coordinates to detect certain properties characteristic of each of said plurality of different minutia or aberration types;
    (e) using said processor to determine X-Y coordinates of the detected minutia of said element from said border coordinates; and
    (f) storing said minutia X-Y coordinates in a digital storage medium as identification data of said detected minutia feature of said element of said image.

2. A method as set forth in claim 1 and including the steps of:
    (a) using said processor to calculate a running average slope of said centerline from said centerline coordinates; and
    (b) storing an average slope of said centerline adjacent said detected minutia in said digital storage medium as additional identification data of said detected minutia of said element of said image.

3. A method for extracting identification data identifying a selected minutia feature from a plurality of different minutia or aberration types of a generally elongated image element of an image from a rectangular image array of pixels representing said image, and comprising the steps of:
    (a) scanning said image array of pixels with a digital processor to detect border pixels defining a border of said elongated element;
    (b) determining rectangular border coordinates of said border pixels by using said processor to determine the X-Y coordinates of the detected border pixels;

(c) calculating rectangular centerline coordinates of an average centerline of said elongated element from said border coordinates by using said processor to determine the X-Y coordinates of pixels centered between opposite border pixels of said image element;

(d) using said processor to calculate a running average slope of said centerline from said centerline X-Y coordinates;

(e) detecting the presence of said selected minutia or aberration feature of said element from said border coordinates by using said processor to test said border coordinates to detect certain properties characteristic of each of said plurality of different minutia or aberration types;

(f) using said processor to determine X-Y coordinates of the detected minutia feature of said element from said border coordinates; and (g) storing in a digital storage medium, as identification data of said minutia feature, said minutia X-Y coordinates and an average slope of said centerline adjacent said detected minutia feature of said element of said image.

4. A method as set forth in claim 3 wherein said image element includes more than one minutia feature, and including the step of:

(a) using said processor to perform said steps of detecting border pixels, determining rectangular border coordinates, calculating rectangular centerline coordinates, calculating a running average slope, detecting the presence and rectangular feature coordinates, and storing feature coordinates and an average slope in said digital storage medium for each minutia feature of said image element.

5. A method as set forth in claim 4 wherein said image includes a plurality of generally elongated image elements, and including the step of:

(a) using said processor to perform said steps of detecting border pixels, determining rectangular border coordinates, calculating rectangular centerline coordinates, calculating a running average slope, detecting the presence and rectangular feature coordinates, and storing feature coordinates and an average slope in said digital storage medium for at least one minutia feature of a plurality of selected image elements of said image.

6. A method as set forth in claim 5 and including the steps of:

(a) using said processor to divide said image array into a grid of image blocks, each said block including a plurality of pixels of said image in each of two rectangular dimensions;

(b) using said processor to define a slope array consisting of a composite average slope corresponding to each of said image blocks; and (c) using said processor to calculate a composite average slope corresponding to each image block from the average slope of the centerline of the portion of each minutia feature which is positioned within said image block.

7. A method as set forth in claim 4 wherein said image is a digitized representation of an image of a fingerprint, said image elements are representations of ridges of said fingerprint, and said minutia features of said elements are minutiae of said ridges, and including the step of:

(a) using said processor to perform said steps of detecting border pixels, determining rectangular border coordinates, calculating rectangular centerline coordinates, calculating a running average slope, detecting the presence of minutia features and determining X-Y minutia feature coordinates and an average slope for at least one minutia of selected ridges of said image of said fingerprint and storing said X-Y coordinates and said average slope for each detected minutia in said digital storage medium.

8. A method as set forth in claim 4 wherein said image is a digitized representation of an image of a fingerprint, said image elements are representations of valleys between ridges of said fingerprint, and said minutia features of said elements are minutiae of said valleys, and including the step of:

(a) using said processor to perform said steps of detecting border pixels, determining rectangular border coordinates, calculating rectangular centerline coordinates, calculating a running average slope, detecting the presence of and determining X-Y minutia feature coordinates and an average slope for at least one minutia of selected valleys of said image of said fingerprint, and storing said X-Y coordinates and said average slope for each detected minutia in said digital storage medium.

9. A method as set forth in claim 4 wherein said image is a digitized representation of an image of a fingerprint, said image elements are representations of ridges and valleys between ridges of said fingerprint, and said minutia features of said elements are minutiae of said ridges and valleys, and including the step of:

(a) using said processor to perform said steps of detecting border pixels, determining rectangular border coordinates, calculating rectangular centerline coordinates, calculating a running average slope, detecting the presence of, the X-Y coordinates of at least one minutia and the average slope for at least one minutia, and storing said X-Y coordinates and said average slope for each detected minutia of selected ridges and valleys of said image of said fingerprint.

10. A method for extracting information identifying a fingerprint formed of a pattern of ridges separated by valleys and comprising the steps of:

(a) scanning a fingerprint via a fingerprint scanner;

(b) using a frame grabber or similar device to generate a digital image array of data units associated with pixels forming an image of said fingerprint, as said fingerprint is scanned;

(c) using a digital processor to scan said digital image array to locate opposite border lines of ridges of said fingerprint by analysis of said data units associated with said pixels;

(d) generating, via said processor, a respective centerline between opposite border lines of each ridge;

(e) calculating, via said processor, a running average slope of said centerline;

(f) locating at least one minutia or aberration of selected ridges by analysis of said opposite border lines of said ridges, by using said processor to test said border lines to detect certain properties characteristic of each of a plurality of different minutia or aberration types; and (g) storing, in a digital storage medium, information identifying said fingerprint, said stored information including the location of said minutia of said selected ridges in association with an average slope of the centerline of each selected ridge adjacent said minutia.

11. A method as set forth in claim 10 wherein the minutiae of said selected ridges include divergences of said ridges and wherein said identifying said fingerprint step includes the steps of:
   (a) defining a minutia table within said storage medium which is associated with said fingerprint; and
   (b) using said processor to store, in said minutia table, locations of divergences of said selected ridges.

12. A method as set forth in claim 10 wherein said step of locating at least one minutia of selected ridges includes the step of:
   (a) using said processor to select only ridges which are longer than a selected minimum length for storage of said locations and average centerline slopes.

13. A method as set forth in claim 10 wherein each pixel of said image array has associated therewith a ridge binary value if said pixel forms a portion of a ridge and a valley binary value if said pixel forms a portion of a valley, and including the step of:
   (a) using said processor to locate said opposite border lines by detecting said ridge binary value of ridge border pixels of said ridges which are immediately adjacent pixels along said border lines which have said valley binary value.

14. A method as set forth in claim 13 and including the step of:
   (a) upon detecting said ridge binary value of said ridge border pixels, using said processor to change said ridge border pixels to a ridge border binary value.

15. A method as set forth in claim 10 wherein each pixel of said image array has associated therewith a ridge binary value if said pixel forms a portion of a ridge and a valley binary value if said pixel forms a portion of a valley, and said opposite border line locating step includes the steps of:
   (a) using said processor to sequentially read the binary values of said pixels of said array in a selected direction of said array;
   (b) using said processor to detect a transition from said valley binary value to said ridge binary value at a first border of a ridge, and to designate as a first border tracker pixel the first pixel detected with said ridge binary value;
   (c) using said processor to continue to read through said array in said selected direction until detecting a transition from said ridge binary value to said valley binary value at a second border of said ridge;
   (d) designating, via said processor, as a second border tracker pixel the last pixel with said ridge binary value before detecting a pixel with said valley binary value;
   (e) using said processor to vary the coordinates of said second tracker pixel by using a border outlining algorithm to move said second tracker to a minimum distance along said second border from said first tracker pixel; and
   (f) using said processor to alternately move said first and second tracker pixels respectively along said first and second borders in the same general direction relative to said array to locate all ridge border pixels along said first and second borders, using said border outlining algorithm.

16. A method as set forth in claim 10 wherein each pixel of said image array has associated therewith a ridge binary value if said pixel forms a portion of a ridge and a valley binary value if said pixel forms a portion of a valley, and said opposite border line locating step includes the steps of:
   (a) using said processor to sequentially read the binary values of said pixels of said array in a selected direction of said array;
   (b) using said processor to detect a transition from said valley binary value to said ridge binary value at a first border of a ridge, and to designate as a first border tracker pixel the first pixel detected with said ridge binary value;
   (c) using said processor to continue to read through said array in said selected direction until detecting a transition from said ridge binary value to said valley binary value at a second border of said ridge;
   (d) using said processor to designate as a second border tracker pixel the last pixel with said ridge binary value before detecting a pixel with said valley binary value;
   (e) varying, via said processor, the coordinates of said second tracker pixel by using a border outlining algorithm to move said second tracker to a minimum distance along said second border from said first tracker pixel;
   (f) using said processor to alternately move said first and second tracker pixels respectively along said first and second borders in the same general direction relative to said array to locate all ridge border pixels along said first and second borders, using said border outlining algorithm; and
   (g) using said processor to move said first and second tracker pixels in such an alternating movement cycle as to maintain said first and second tracker pixels respectively at said first and second borders and at substantially a minimum separation distance between said first and second tracker pixels.

17. A method as set forth in claim 16, wherein said generating step includes the steps of:
   (a) after each movement cycle, calculating, via said processor, a current midpoint between said first and second tracker pixels; and
   (b) generating, via said processor, said centerline between said first and second borders by interconnecting adjacent midpoints of said ridge.

18. A method as set forth in claim 17 wherein said calculating step includes:
   (a) selecting, via said processor, only the most recently calculated midpoints for calculation of said centerline running average slope.

19. A method as set forth in claim 16 and including the step of:
   (a) after each move of said first or second tracker pixel, comparing, via said processor, the coordinates of said tracker pixels to detect a possible ridge ending if the respective coordinates of said first and second tracker pixels are equal.

20. A method as set forth in claim 16 and including the step of:
   (a) upon detecting said possible ridge ending, using said processor to move said first tracker pixel a selected number of moves along said first border to detect further ridge border pixels having said ridge binary value;
   (b) upon detecting said further ridge border pixels, using said processor to continue to alternately move said first and second tracker pixels to locate further ridge border pixels; and (c) upon failing to detect said further ridge border pixels, designating, via said processor, a ridge end pixel of said ridge at a ridge border pixel at which the coordinates of said first and second tracker pixels are detected to be equal.

21. A method as set forth in claim 20 and including the steps of:

(a) upon designating a ridge end pixel, examining, via said processor, pixels within a selected proximity of said end pixel for the presence of a proximate ridge within said selected proximity to the current ridge; and (b) upon detecting said proximate ridge, using said processor to connect said proximate ridge to said current ridge while continuing to alternately move said first and second tracker pixels to locate further ridge border pixels.

22. A method as set forth in claim 16 and including the steps of:

(a) after each movement cycle, designating, via said processor, an aberration test line of pixels between said first and second tracker pixels;

(b) testing, via said processor, each pixel of said aberration test line for the presence of an aberration pixel having said valley binary value;

(c) upon detecting said aberration pixel, using said processor to conduct a stop sequence of aberration tests in which the sequence of aberration tests is terminated upon one of the aberration tests succeeding in identifying a type of ridge aberration associated with said aberration pixel as a ridge pore, a ridge spur, or a ridge convergence; and (d) upon all of said aberration tests failing, identifying, via said processor, a ridge divergence minutia at said aberration pixel.

23. A method as set forth in claim 22 in which one of said ridge aberration tests is a ridge pore test, including the steps of:

(a) designating, via said processor, a pore tracker pixel at coordinates of said aberration pixel;

(b) moving, via said processor, said pore tracker pixel to track a border contiguous with said aberration pixel using said border outlining algorithm;

(c) after each move of said pore tracker pixel, comparing, via said processor, current coordinates of said pore tracker pixel with said coordinates of said aberration pixel; and (d) upon said coordinates of said pore tracker pixel equaling said coordinates of said aberration pixel within a selected number of moves of said pore tracker pixel, using said processor to identify said ridge aberration as a ridge pore.

24. A method as set forth in claim 22 in which one of said ridge aberration tests is a ridge spur test to identify a ridge spur along one of said first and second borders of said ridge, said ridge spur test including the steps of:

(a) designating, via said processor, a spur tracker pixel at coordinates of the one of said first and second tracker pixels which is associated with the one of said first and second borders which is being tested for a spur;

(b) designating, via said processor, a spur test end pixel at the first ridge pixel along said aberration test line on the opposite side of said aberration pixel from said one of said tracker pixels;

(c) using said processor to move said spur tracker pixel along said one of said borders using said border outlining algorithm from said one of said tracker pixels toward said spur test end pixel;

(d) after each move of said spur tracker pixel, comparing, via said processor, current coordinates of said spur tracker pixel with coordinates of said spur test end pixel; and (e) upon said coordinates of said spur tracker pixel equaling said coordinates of said spur test end pixel within a selected number of moves of said spur tracker pixel, using said processor to identify said ridge aberration as a ridge spur.

25. A method as set forth in claim 22 in which one of said ridge aberration tests is a convergence test to identify a ridge convergence along one of said first and second borders of said ridge including the steps of:

(a) designating, via said processor, a convergence test end pixel at the first ridge pixel along said aberration test line on the opposite side of said aberration pixel from the one of said tracker pixels which is associated with the one of said first and second borders which is being tested for a convergence;

(b) designating, via said processor, a convergence tracker pixel at coordinates of said one of tracker pixels;

(c) using said processor to move said convergence tracker pixel along said one of said borders using said border outlining algorithm from said one of said tracker pixels toward said convergence test end pixel;

(d) after each move of said convergence tracker pixel, comparing, via said processor, current coordinates of said convergence tracker pixel with coordinates of said convergence test end pixel; and (e) upon said coordinates of said convergence tracker pixel equaling said coordinates of said convergence test end pixel within a selected number of moves of said convergence tracker pixel, using said processor to identify said ridge aberration as a ridge convergence.

26. A method as set forth in claim 22 wherein said ridge divergence has a top fork and a bottom fork and, upon detecting said ridge divergence, said processor:

(a) locates all ridge border pixels along an upper border and a lower border of one of said forks; and (b) locates all ridge border pixels along an upper border and a lower border of the other of forks.

27. A method as set forth in claim 22 and including the steps of:

(a) after each movement cycle, calculating, via said processor, a current midpoint between said first and second tracker pixels; and (b) upon detecting said ridge divergence, calculating, via said processor, a ridge divergence slope of said ridge divergence from a selected number of the most previously calculated midpoints.

28. A method as set forth in claim 27 and including the steps of:

(a) defining, in said storage medium, a minutia location table associated with said fingerprint;

(b) upon detecting a ridge divergence, using said processor to store, in said minutia location table, the coordinates of said aberration pixel and said divergence slope to identify the detected ridge divergence as a minutia of said fingerprint.

29. A method as set forth in claim 10 and including the steps of:

(a) using said processor to locate opposite border lines of valleys of said fingerprint by analysis of said data units associated with said pixels;

(b) generating, via said processor, a respective valley centerline between opposite border lines of each valley;

(c) using said processor to calculate a running average slope of said valley centerline;

(d) locating at least one minutia or aberration of selected valleys by analysis of said opposite border lines of said valleys by using said processor to test said border lines to detect certain properties characteristic of each of a plurality of different minutia or aberration types; and (e) storing, in said digital storage medium, further information identifying said fingerprint, said further information including the location of said minutia of said selected valleys in association with an average slope of the valley centerline of each selected valley adjacent said minutia.

30. A method as set forth in claim 29 wherein said step of locating at least one minutia of selected valleys includes the step of:

(a) using said processor to select only valleys which are longer than a selected minimum length for storage of said locations and average centerline slopes.

31. A method as set forth in claim 29 wherein the minutiae of said selected valleys include divergences of said valleys and said storing step includes:

(a) using said processor to store in said digital storage medium locations of divergences of said selected valleys.

32. A method as set forth in claim 29 wherein each pixel of said image array has associated therewith a ridge binary value if said pixel forms a portion of a ridge and a valley binary value if said pixel forms a portion of a valley, wherein said valley border detecting step includes:

(a) using said processor to detect said valley binary value of valley border pixels of said valleys which are immediately adjacent pixels of said border lines which have said ridge binary value.

33. A method as set forth in claim 32 and including the step of:

(a) upon detecting said valley binary value of said valley border pixels, using said processor to change said valley border pixels to a valley border binary value.

34. A method as set forth in claim 29 wherein each pixel of said image array has associated therewith a ridge binary value if said pixel forms a portion of a ridge and a valley binary value if said pixel forms a portion of a valley, and including the step of detecting valley border pixels of a valley which includes the steps of:

(a) using said processor to sequentially read the binary values of said pixels of said array in a selected direction of said array;

(b) using said processor to detect a transition from said ridge binary value to said valley binary value at a first border of a valley, and to designate as a first border tracker pixel the first pixel detected with said valley binary value;

(c) using said processor to continue to read through said array in said selected direction until detecting a transition from said valley binary value to said ridge binary value at a second border of said valley;

(d) designating, via said processor, as a second border tracker pixel the last pixel with said valley binary value before detecting a pixel with said ridge binary value;

(e) using said processor to vary the coordinates of said second tracker pixel by using a border outlining algorithm to move said second tracker to a minimum distance along said second border from said first tracker pixel; and (f) using said processor to alternately move said first and second tracker pixels respectively along said first and second borders in the same general direction relative to said array to locate all valley border pixels along said first and second borders by using said border outlining algorithm.

35. A method as set forth in claim 29 wherein each pixel of said image array has associated therewith a ridge binary value if said pixel forms a portion of a ridge and a valley binary value if said pixel forms a portion of a valley, and including the step of detecting valley border pixels of a valley which includes the steps of:

(a) using said processor to sequentially read the binary values of said pixels of said array in a selected direction of said array;

(b) using said processor to detect a transition from said ridge binary value to said valley binary value at a first border of a valley, and to designate as a first border tracker pixel the first pixel detected with said valley binary value;

(c) using said processor to continue to read through said array in said selected direction until detecting a transition from said valley binary value to said ridge binary value at a second border of said valley;

(d) using said processor to designate as a second border tracker pixel the last pixel with said valley binary value before detecting a pixel with said ridge binary value;

(e) varying, via said processor, the coordinates of said second tracker pixel by using a border outlining algorithm to move said second tracker a minimum distance along said second border from said first tracker pixel;

(f) using said processor to alternately move said first and second tracker pixels respectively along said first and second borders in the same general direction relative to said array to locate all valley border pixels along said first and second borders, using said border outlining algorithm; and (g) using said processor to move said first and second tracker pixels in such an alternating movement cycle as to maintain said first and second tracker pixels respectively at said first and second borders and at substantially a minimum separation distance between said first and second tracker pixels.

36. A method as set forth in claim 35 and including the steps of:

(a) after each movement cycle, calculating, via said processor, a current midpoint between said first and second tracker pixels; and (b) generating, via said processor, said centerline between said first and second borders by interconnecting adjacent midpoints of said valley.

37. A method as set forth in claim 36 and wherein said valley running average slope calculating step includes:

(a) selecting, via said processor, only the most recently calculated midpoints for calculation of said centerline running average slope.

38. A method as set forth in claim 35 and including the step of:
  (a) after each move of said first or second tracker pixel, comparing, via said processor, the coordinates of said tracker pixels to detect a possible valley ending if the respective coordinates of said first and second tracker pixels are equal.

39. A method as set forth in claim 38 and including the step of:
  (a) upon detecting said possible valley ending, using said processor to move said first tracker pixel a selected number of moves along said first border to detect further valley border pixels having said valley binary value;
  (b) upon detecting said further valley border pixels, using said processor to continue to alternately move said first and second tracker pixels to locate further valley border pixels; and
  (c) upon failing to detect said further valley border pixels, designating, via said processor, a valley end pixel of said valley at a valley border pixel at which the coordinates of said first and second tracker pixels are detected to be equal.

40. A method as set forth in claim 39 and including the steps of:
  (a) upon designating a valley end pixel, examining, via said processor, pixels within a selected proximity of said end pixel for the presence of a proximate valley within said selected proximity to the current valley; and
  (b) upon detecting said proximate valley, using said processor to connect said proximate valley to said current valley while continuing to alternately move said first and second tracker pixels to locate further valley border pixels.

41. A method as set forth in claim 35 and including the steps of:
  (a) after each movement cycle, designating, via said processor, an aberration test line of pixels between said first and second tracker pixels;
  (b) testing, via said processor, each pixel of said aberration test line for the presence of an aberration pixel having said ridge binary value;
  (c) upon detecting said aberration pixel, using said processor to conduct a stop sequence of aberration tests in which the sequence of aberration tests is terminated upon one of the aberration tests succeeding in identifying a type of valley aberration associated with said aberration pixel as a valley pore, a valley spur, or a valley convergence; and
  (d) upon all of said aberration tests failing, identifying, via said processor, a valley divergence minutia at said aberration pixel.

42. A method as set forth in claim 41 in which one of said valley aberration tests is a pore test, including the steps of:
  (a) designating, via said processor, a pore tracker pixel at coordinates of said aberration pixel;
  (b) moving, via said processor, said pore tracker pixel to track a border contiguous with said aberration pixel using said border outlining algorithm;
  (c) after each move of said pore tracker pixel, comparing, via said processor, current coordinates of said pore tracker pixel with said coordinates of said aberration pixel; and
  (d) upon said coordinates of said pore tracker pixel equaling said coordinates of said aberration pixel within a selected number of moves of said pore tracker pixel, using said processor to identify said valley aberration as a valley pore.

43. A method as set forth in claim 41 in which one of said valley aberration tests is a valley spur test to identify a valley spur along one of said first and second borders of said valley, said spur test including the steps of:
  (a) designating, via said processor, a spur tracker pixel at coordinates of the one of said first and second tracker pixels which is associated with the one of said first and second borders which is being tested for a spur;
  (b) designating, via said processor, a spur test end pixel at the first valley pixel along said aberration test line on the opposite side of said aberration pixel from said one of said tracker pixels;
  (c) using said processor to move said spur tracker pixel along said one of said borders using said border outlining algorithm from said one of said tracker pixels toward said spur test end pixel;
  (d) after each move of said spur tracker pixel, comparing, via said processor, current coordinates of said spur tracker pixel with coordinates of said spur test end pixel; and
  (e) upon said coordinates of said spur tracker pixel equaling said coordinates of said spur test end pixel within a selected number of moves of said spur tracker pixel, using said processor to identify said valley aberration as a valley spur.

44. A method as set forth in claim 41 in which one of said valley aberration tests is a convergence test to identify a valley convergence along one of said first and second borders of said valley, including the steps of:
  (a) designating, via said processor, a convergence test end pixel at the first valley pixel along said aberration test line on the opposite side of said aberration pixel from the one of said tracker pixels which is associated with the one of said first and second borders which is being tested for a convergence;
  (b) designating, via said processor, a convergence tracker pixel at coordinates of said one of tracker pixels;
  (c) using said processor to move said convergence tracker pixel along said one of said borders using said border outlining algorithm from said one of said tracker pixels toward said convergence test end pixel;
  (d) after each move of said convergence tracker pixel, comparing, via said processor, current coordinates of said convergence tracker pixel with coordinates of said convergence test end pixel; and
  (e) upon said coordinates of said convergence tracker pixel equaling said coordinates of said convergence test end pixel within a selected number of moves of said convergence tracker pixel, using said processor to identify said valley aberration as a valley convergence.

45. A method as set forth in claim 41 wherein said valley divergence has a top fork and a bottom fork and, upon detecting said valley divergence, said processor:
  (a) locates all valley border pixels along an upper border and a lower border of one of said forks; and
  (b) locates all valley border pixels along an upper border and a lower border of the other of forks.

46. A method as set forth in claim 41 and including the steps of:

(a) after each movement cycle, calculating, via said processor, a current midpoint between said first and second tracker pixels; and (b) upon detecting said valley divergence, calculating, via said processor, a valley divergence slope of said valley divergence from a selected number of the most previously calculated midpoints.

47. A method as set forth in claim 46 and including the steps of:

(a) defining, in said storage medium, a minutia location table associated with said fingerprint;

(b) upon detecting a valley divergence, using said processor to store, in said minutia location table, the coordinates of said aberration pixel and said divergence slope to identify the detected valley divergence as a minutia of said fingerprint.

* * * * *